(12) United States Patent
Molgaard et al.

(10) Patent No.: US 10,706,892 B2
(45) Date of Patent: *Jul. 7, 2020

(54) METHOD AND APPARATUS FOR FINDING AND USING VIDEO PORTIONS THAT ARE RELEVANT TO ADJACENT STILL IMAGES

(71) Applicant: Apple Inc., Cupertino, CA (US)

(72) Inventors: Claus Molgaard, Los Gatos, CA (US); Brett M. Keating, San Jose, CA (US); George E. Williams, Pleasanton, CA (US); Marco Zuliani, Los Gatos, CA (US); Vincent Y. Wong, Santa Clara, CA (US); Frank Doepke, San Jose, CA (US); Ethan J. Tira-Thompson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/199,645

(22) Filed: Nov. 26, 2018

(65) Prior Publication Data

US 2019/0096441 A1 Mar. 28, 2019

Related U.S. Application Data

(63) Continuation of application No. 14/865,752, filed on Sep. 25, 2015, now Pat. No. 10,170,157.

(Continued)

(51) Int. Cl.
*G11B 27/34* (2006.01)
*G06K 9/00* (2006.01)
(Continued)

(52) U.S. Cl.
CPC .......... *G11B 27/34* (2013.01); *G06K 9/00268* (2013.01); *G06K 9/00718* (2013.01);
(Continued)

(58) Field of Classification Search
CPC .. G11B 27/34; H04N 5/2621; H04N 5/23229; H04N 5/23245; H04N 5/2353;
(Continued)

(56) References Cited

U.S. PATENT DOCUMENTS 7,027,086 B1 4/2006 Ozawa
8,837,900 B2 9/2014 Sammon
(Continued)

FOREIGN PATENT DOCUMENTS

CN 1890955 A 1/2007
CN 101668123 A 3/2010
(Continued)

OTHER PUBLICATIONS

International Search Report and Written Opinion received in PCT Application No. PCT/US2016/036078, dated Aug. 19, 2016.

*Primary Examiner* — Jason A Flohre
(74) *Attorney, Agent, or Firm* — Blank Rome LLP

(57) ABSTRACT

The invention relates to systems, methods, and computer readable media for responding to a user snapshot request by capturing anticipatory pre-snapshot image data as well as post-snapshot image data. The captured information may be used, depending upon the embodiment, to create archival image information and image presentation information that is both useful and pleasing to a user. The captured information may automatically be trimmed or edited to facilitate creating an enhanced image, such as a moving still image. Varying embodiments of the invention offer techniques for trimming and editing based upon the following: exposure, brightness, focus, white balance, detected motion of the camera, substantive image analysis, detected sound, image metadata, and/or any combination of the foregoing.

20 Claims, 10 Drawing Sheets

Related U.S. Application Data

(60) Provisional application No. 62/172,107, filed on Jun. 7, 2015.

(51) Int. Cl.
  *H04N 5/232* (2006.01)
  *G06K 9/46* (2006.01)
  *H04N 5/235* (2006.01)
  *H04N 5/262* (2006.01)

(52) U.S. Cl.
  CPC ......... *G06K 9/4661* (2013.01); *H04N 5/2352* (2013.01); *H04N 5/2353* (2013.01); *H04N 5/23229* (2013.01); *H04N 5/23245* (2013.01); *H04N 5/2621* (2013.01)

(58) Field of Classification Search
  CPC ............. H04N 5/2352; G06K 9/00268; G06K 9/00718; G06K 9/4661
  See application file for complete search history.

(56) References Cited

U.S. PATENT DOCUMENTS

| | | |
|---|---|---|
| 2004/0130628 A1 | 7/2004 | Stavely |
| 2005/0231631 A1* | 10/2005 | Miyazaki ........... H04N 5/23293 348/362 |
| 2006/0120692 A1 | 6/2006 | Fukuta |
| 2006/0177207 A1 | 8/2006 | Bang |
| 2007/0019094 A1 | 1/2007 | Silberstein |
| 2007/0081796 A1 | 4/2007 | Fredlund |
| 2007/0216777 A1 | 9/2007 | Quan |
| 2007/0270182 A1 | 11/2007 | Gulliksson |
| 2008/0001950 A1* | 1/2008 | Lin ........................ G06T 13/80 345/473 |
| 2008/0316327 A1 | 12/2008 | Steinberg |
| 2009/0073286 A1 | 3/2009 | Sugino |
| 2010/0045821 A1 | 2/2010 | Mergler |
| 2010/0172641 A1 | 7/2010 | Sasaki |
| 2011/0293244 A1* | 12/2011 | Kuriyama .......... H04N 5/23245 386/248 |
| 2012/0062759 A1* | 3/2012 | Nishi ................. H04N 5/23277 348/222.1 |
| 2012/0098983 A1 | 4/2012 | Ojala |
| 2012/0170868 A1 | 7/2012 | Wang |
| 2012/0208592 A1 | 8/2012 | Davis |
| 2012/0242853 A1 | 9/2012 | Jasinski |
| 2012/0294549 A1 | 11/2012 | Doepke |
| 2012/0300023 A1 | 11/2012 | Lee |
| 2013/0033566 A1 | 2/2013 | Sento |
| 2013/0047081 A1 | 2/2013 | Long |
| 2013/0051620 A1 | 2/2013 | Endo |
| 2013/0229581 A1* | 9/2013 | Joshi .................... G11B 27/031 348/584 |
| 2013/0235220 A1 | 9/2013 | Williams |
| 2014/0085489 A1 | 3/2014 | Crisan |
| 2014/0123041 A1 | 5/2014 | Morse |
| 2014/0184852 A1 | 7/2014 | Niemi |
| 2014/0219628 A1 | 8/2014 | Miner |
| 2014/0354845 A1 | 12/2014 | Mølgaard |
| 2014/0354850 A1 | 12/2014 | Kosaka |
| 2014/0362256 A1 | 12/2014 | Schulze |
| 2015/0054970 A1 | 2/2015 | Hamada |
| 2015/0124121 A1 | 5/2015 | Kaku |

FOREIGN PATENT DOCUMENTS

| | | |
|---|---|---|
| CN | 102572256 A | 7/2012 |
| WO | 2014027567 A1 | 2/2014 |

\* cited by examiner

METHOD AND APPARATUS FOR FINDING AND USING VIDEO PORTIONS THAT ARE RELEVANT TO ADJACENT STILL IMAGES

FIELD OF THE DISCLOSURE

This disclosure relates generally to the field of digital image capture and processing. More particularly, the disclosure relates to systems and processes for capturing image information temporally surrounding a still image that is selected by the user of a camera or camera interface of a computing device. The disclosure discusses the use of the surrounding information in combination with the still image to form an enhanced image or enhanced media product.

RELATED MATTERS

This disclosure is a continuation of nonprovisional application Ser. No. 14/865,752, entitled "Method and Apparatus for Finding and Using Video Portions that are Relevant to Adjacent Still Images, filed Sep. 25, 2015, which claims priority to provisional application No. 62/172,107, entitled "Method And Apparatus For Finding And Using Video Portions That Are Relevant To Adjacent Still Images," filed Jun. 7, 2015, both of which are incorporated by reference in their entireties.

BACKGROUND

Many of today's portable devices, such as smailphones, provide image capture capability such as still and video capture functionality. For example, a user of the typical portable device such as a camera, tablet, or cell phone, can capture both still images and video through a camera or camera interface on the device. Today's users have interest in experiencing images in a manner that is richer than conventional still photography. Thus, many smailphones and cameras offer a variety of capture modes and processing effects to make images more rich and satisfying to the user.

SUMMARY

A typical user interaction with a camera involves the user (e.g., a human, a machine, etc.) monitoring a view finder or screen and deciding when to capture a still image or begin capturing a video. When the user makes the decision to capture a still or begin video capture, the user generally indicates the decision by pressing a button, interacting with a GUI, or setting a timer (e.g., timed capture). The button press or indication to capture may be called snapping the shot.

Embodiments of the disclosure seek to anticipate and respond to a user snap by capturing sequential images or video both prior to the snap and after the snap. The resulting captured data might then include, for example, image information temporally preceding the snap, one or more images at the point of the snap (or at timer expiry in the case of a timer), or image information temporally following the snap. Furthermore, in some embodiments, in addition to capturing image data, contextual data may also be captured and retained. Contextual data may include camera metadata, sensor-output-associated with the device, application data associated with the device, network-available data associated with the device, and any other available contextual data.

Having captured a bundle of image information surrounding a user's selected snapshot, some embodiments of the disclosure seek to create an enhanced image by using the pre-snap and post-snap information to enrich the visual experience of the snapshot. For example, brief looping video, such as a moving still image, may be presented (as a matter of semantics, the term moving still image is used to refer to a brief looping video or a still image in which a portion of the image shows repeated or looping movement). However, the collected image information may contain irrelevant aspects and frames. For example, the image capture period may start too early and acquire the scene before the subject enters, interruptions (e.g., blocked lens) may obscure the subject briefly at any point, and the image capture period may extend too long and may acquire the scene after the subject departs. Thus, many embodiments of the disclosure contemplate automatically trimming and/or editing the captured image information to eliminate irrelevant content or mitigate its presence.

In the process of creating an enhanced image, differing embodiments of the disclosure automatically trim content from collected image data due to one or more of the following detected reasons: exposure, brightness, focus, white balance, detected motion of the camera, substantive image analysis, detected sound, image metadata, or any combination of the foregoing.

DETAILED DESCRIPTION

Figure 1:
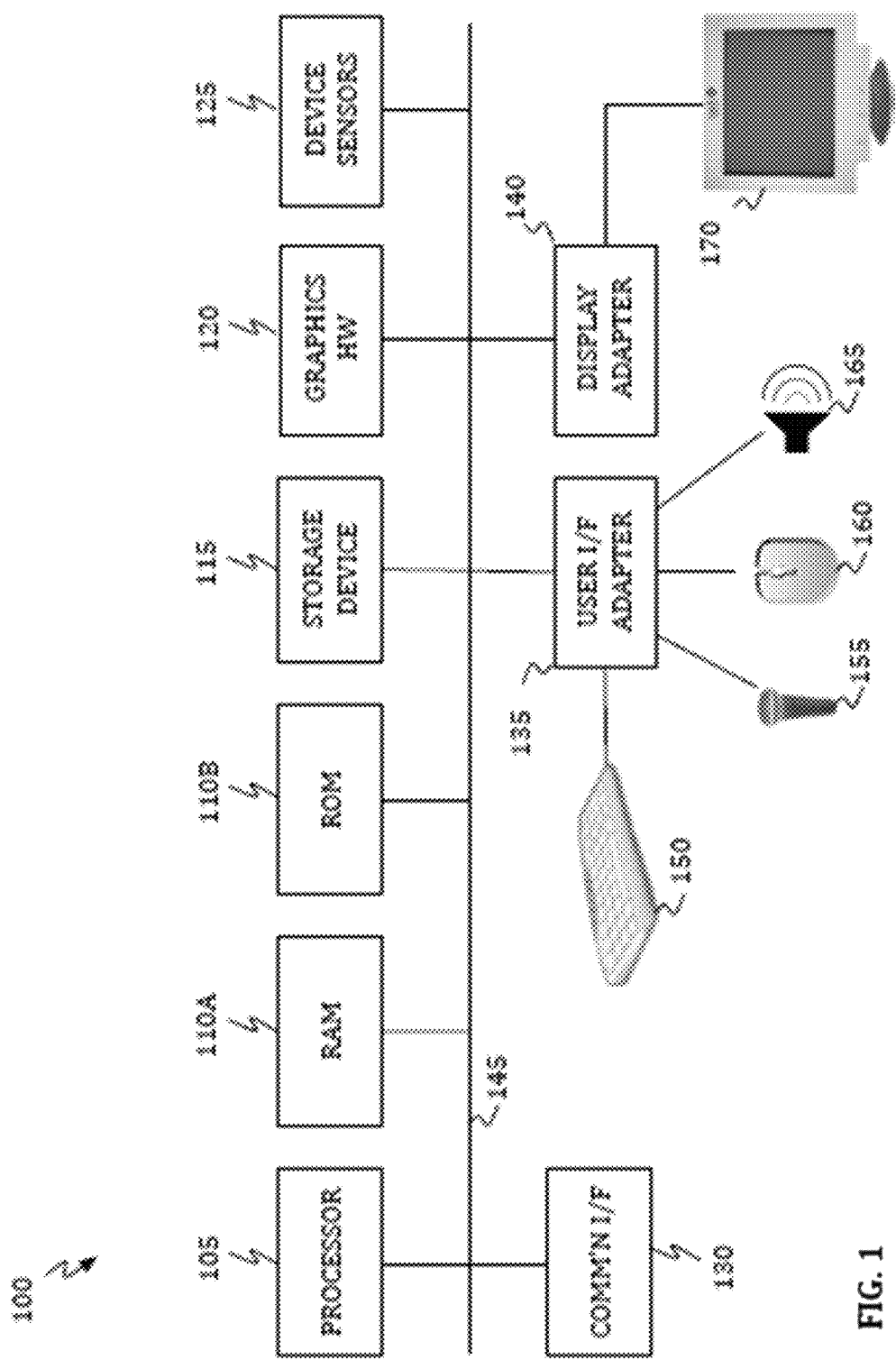
FIG. 1 shows a representative hardware environment.

This disclosure pertains to systems, methods, and computer readable media to improve the operation of a camera system. It also pertains to a variety of architectures for design and/or operation of a camera relating to capturing and processing image information to create archival image information and image presentation information that is both useful and pleasing to a user. In general, many embodiments of the invention relate to responding to a user's desire to capture a still image by actually capturing a long sequence of frames analogous to video. While one or more frames from the long sequence may be designated as the user's choice for a captured frame, the remainder of the frames may be used as enhancement information, for example to create a moving still image. Varying embodiments of the disclosure relate to choosing useful frames for enhancement information or eliminating frames that are not useful. In addition, many other systems and techniques are discussed.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes and may not have been selected to delineate or circumscribe the inventive subject matter, leaving resorting to the claims as a potential necessity to determine such inventive subject matter. Reference in this disclosure to "one embodiment" or to "an embodiment" or "embodiments" means that a particular feature, structure, or characteristic described in connection with the invention is included in at least one embodiment of the disclosed subject matter, and multiple references to "'one embodiment" or "an embodiment" should not be understood as necessarily all referring to the same embodiment.

It will be appreciated that, in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nonetheless be a routine undertaking for those having the benefit of this disclosure and being of ordinary skill in the design and implementation of computing systems and/or graphics systems.

Exemplary Hardware and Software

The inventive embodiments described herein relate to image capture and therefore are often embodied in camera type devices or systems used with camera type devices. Since many embodiments rely on computing operations and systems, this disclosure may have implication and use in and with respect to all types of intelligent devices, including single- and multi-processor computing systems and vertical devices (e.g., cameras, gaming systems, appliances, etc.) that incorporate single- or multi-processing computing systems. The discussion herein is made with reference to a common computing configuration that may be discussed as a server system or an end-user system. This common computing configuration may have a CPU resource including one or more microprocessors. This discussion is only for illustration regarding sample embodiments and is not intended to confine the application of the invention to the disclosed hardware. Other systems having other known or common hardware configurations (now or in the future) are fully contemplated and expected. With that caveat, a typical hardware and software operating environment is discussed below. The hardware configuration may be found, for example, in a camera, a security system, a server, a workstation, a laptop, a tablet, a desktop computer, a gaming platform (whether or not portable), a television, an entertainment system, a smart phone, a phone, or any other computing device, whether mobile or stationary.

Referring to FIG. 1, the disclosed embodiments may be performed by representative computer system 100. For example the representative computer system 100 may act as a server or an end-user device. System 100 may be embodied in any type of device such as a camera, a general purpose computer system, a television, a set top box, a media player, a multi-media entertainment system, an image processing workstation, a hand-held device (such as a phone), or any device that may be coupled with or may incorporate image capture and/or processing capability. Computer system 100 may include one or more processors 105, memory 110 (110A and 110B), one or more storage devices 115, and graphics hardware 120. Computer system 100 may also have device sensors 125, which may include one or more of: depth sensors (such as a depth camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, SONAR devices, microphones, CCDs (or other image sensors), infrared sensors, thermometers, etc. These and other sensors may work in combination with one or more GPUs, DSPs, or conventional microprocessors along with appropriate programming so the sensor outputs may be properly interpreted and/or combined and interpreted.

Returning to FIG. 1, system 100 may also include communication interface 130, user interface adapter 135, and display adapter 140—all of which may be coupled via system bus or backplane 145. Memory 110 may include one or more different types of media (e.g., solid-state, DRAM, optical, magnetic, etc.) used by processor 105 and graphics hardware 120. For example, memory 110 may include memory cache, read-only memory (ROM), and/or random access memory (RAM). Storage 115 may include one or more non-transitory storage media including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 110 and storage 115 may be used to retain media (e.g., audio, image, and video files), preference information, device profile information, computer program instructions organized into one or more modules and written in any desired computer programming language, and any other suitable data. When executed by processor 105 and/or graphics hardware 120 (which may also be a processor), such computer program code may implement one or more of the methods or processes described herein. Communication interface 130 may include semiconductor-based circuits and may be used to connect computer system 100 to one or more networks. Illustrative networks include, but are not limited to: a local network, such as a USB network; a business's local area network; and a wide area network, such as the Internet; and may use any suitable technology (e.g., wired or wireless). Communications technologies that may be implemented include cell-based communications (e.g., LTE, CDMA, GSM, HSDPA, etc.) or other communications (Ethernet, WiFi, Bluetooth, USB, Thunderbolt, Firewire, etc.). User interface adapter 135 may be used to connect keyboard 150, microphone 155, pointer device 160, speaker 165, and other user interface devices such as a touchpad and/or a touch screen (not shown). Display adapter 140 may be used to connect one or more display units 170 through frame buffers (not shown).

Processor 105 may execute instructions necessary to carry out or control the operation of many functions performed by system 100 (e.g., image evaluation and processing). Processor 105 may, for instance, drive display 170 and receive user input from user interface adapter 135 or any other user interfaces embodied by a system. User interface adapter 135, for example, can take a variety of forms, such as a button, a keypad, a dial, a click wheel, a keyboard, a display screen, and/or a touch screen, or any combination thereof. The user interface items or widgets may be generated by the graphics hardware 120 in real time as a user interacts with the interface. Processor 105 may be any type of computing device such as one or more microprocessors working alone or in combination with GPUs, DSPs, and/or system-on-chip devices such as those found in mobile devices. Processor 105 may include one or more dedicated GPUs or graphics subsystems that accept program instructions to create or alter display information such as pixels. In addition, processor 105 may be based on reduced instruction-set computer (RISC) or complex instruction-set computer (CISC) architectures or any other suitable architecture and may include one or more processing cores. Graphics hardware 120 may be special purpose computational hardware for processing graphics and/or assisting processor 105 in performing computational tasks. In some embodiments, graphics hardware 120 may include CPU-integrated graphics and/or one or more programmable GPUs.

Various embodiments of the invention may employ sensors, such as cameras. Cameras and similar sensor systems may include auto-focus systems to accurately capture video or image data ultimately used to interpret user intent or commands. Since the motion of the user may be based upon subtle activity in small regions in the captured images (e.g., hands, fingers, face, mouth, brow etc.) the autofocus system may be used to separately focus on multiple regions of the image in order to access better information.

Returning to FIG. 1, sensors 125 may capture contextual and/or environmental phenomena such as time; location information; the status of the device with respect to light, gravity, and the magnetic north; and even still and video images. In addition, network-accessible information, such as weather information, may also be used as part of the context. All captured contextual and environmental phenomena may be used to provide context to captured images, user or subject activity or information about user or subject activity. For example, in accessing a sequence of captured images, the contextual information may be used as part of the analysis. The system 100 may react to environmental and contextual events and reflect a reaction in real time by, for example, attaching contextual information to images/frames, performing one or more functions such as an image capture using a certain mode, or by causing activity on the display system through use of the graphics hardware 120.

Output from the sensors 125 may be processed, at least in part, by processors 105 and/or graphics hardware 120, and/or a dedicated image processing unit incorporated within or without system 100. Information so captured may be stored in memory 110 and/or storage 115 and/or any storage accessible on an attached network (such as the Internet). Memory 110 may include one or more different types of media used by processor 105, graphics hardware 120, and sensors 125 to perform device functions. Storage 115 may store data such as media (e.g., audio, image, and video files); metadata for media; computer program instructions; and other software; including database applications (e.g., a database storing avatar frames), preference information, device profile information, and any other suitable data. Memory 110 and storage 115 may be used to retain computer program instructions or code organized into one or more modules in either compiled form or written in any desired computer programming language. When executed by, for example, processor 105, such computer program code may implement one or more of the acts or functions described herein (e.g., implementing image analysis and trimming).

Figure 2:
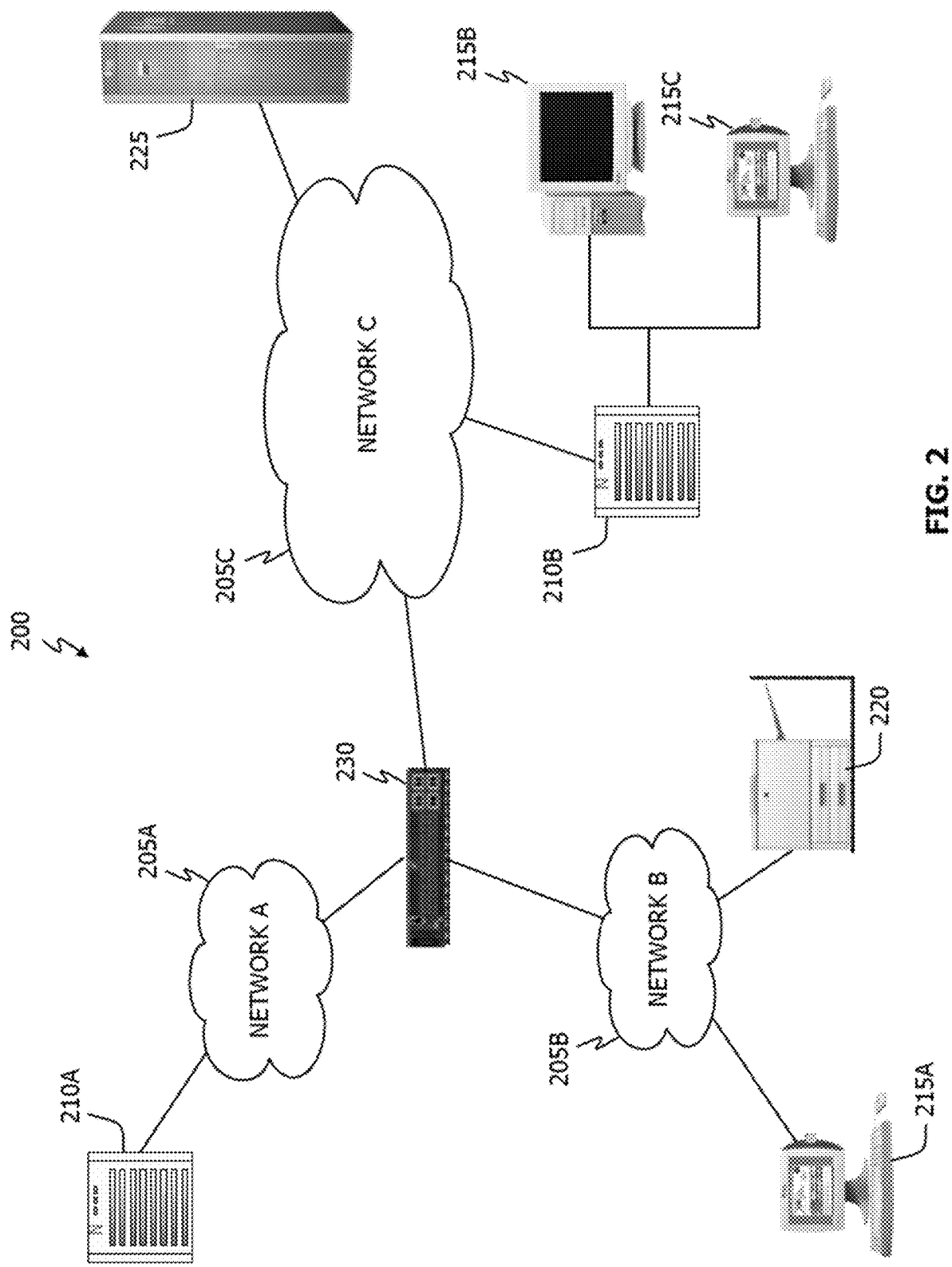
FIG. 2 shows a representative network environment.

Referring now to FIG. 2, illustrative network architecture 200, within which the disclosed techniques may be implemented, includes a plurality of networks 205, (i.e., 205A, 205B, and 205C), each of which may take any form including, but not limited to, a local area network (LAN) or a wide area network (WAN) such as the Internet. Further, networks 205 may use any desired technology (wired, wireless, or a combination thereof) and protocol (e.g., transmission control protocol, TCP). Coupled to networks 205 are data server computers 210 (i.e., 210A and 210B) that are capable of operating server applications such as databases and are also capable of communicating over networks 205. One embodiment using server computers may involve the operation of one or more central systems to collect, process, and evaluate image information (e.g., frames) and/or contextual information, or other information as a proxy for mobile computing devices, such as smart phones or network-connected tablets.

Also coupled to networks 205, and/or data server computers 210, are client computers 215 (i.e., 215A, 215B, and 215C), which may take the form of any computer, set top box, entertainment device, communications device, or intelligent machine, including embedded systems. In some embodiments, users may employ client computers in the form of smart phones or tablets. Also, in some embodiments, network architecture 200 may also include network printers such as printer 220 and storage systems such as 225, which may be used to store multi-media items (e.g., images) that are referenced herein. To facilitate communication between different network devices (e.g., data servers 210, end-user computers 215, network printer 220, and storage system 225), at least one gateway or router 230 may be optionally coupled therebetween. Furthermore, in order to facilitate such communication, each device employing the network may comprise a network adapter. For example, if an Ethernet network is desired for communication, each participating device must have an Ethernet adapter or embedded Ethernet-capable ICs. Further, the devices may carry network adapters for any network in which they may participate.

As noted above, embodiments of the inventions disclosed herein include software. As such, a general description of common computing software architecture is provided as expressed in layer diagrams in FIG. 3. Like the hardware examples, the software architecture discussed here is not intended to be exclusive in any way, but rather illustrative. This is especially true for layer-type diagrams, which software developers tend to express in somewhat differing ways. In this case, the description begins with layers starting with the O/S kernel 31, so lower level software and firmware has been omitted from the illustration, but not from the intended embodiments. The notation employed here is generally intended to imply that software elements shown in a layer use resources from the layers below and provide services to the layers above. However, in practice, all components of a particular software element may not behave entirely in that manner.

Figure 3:
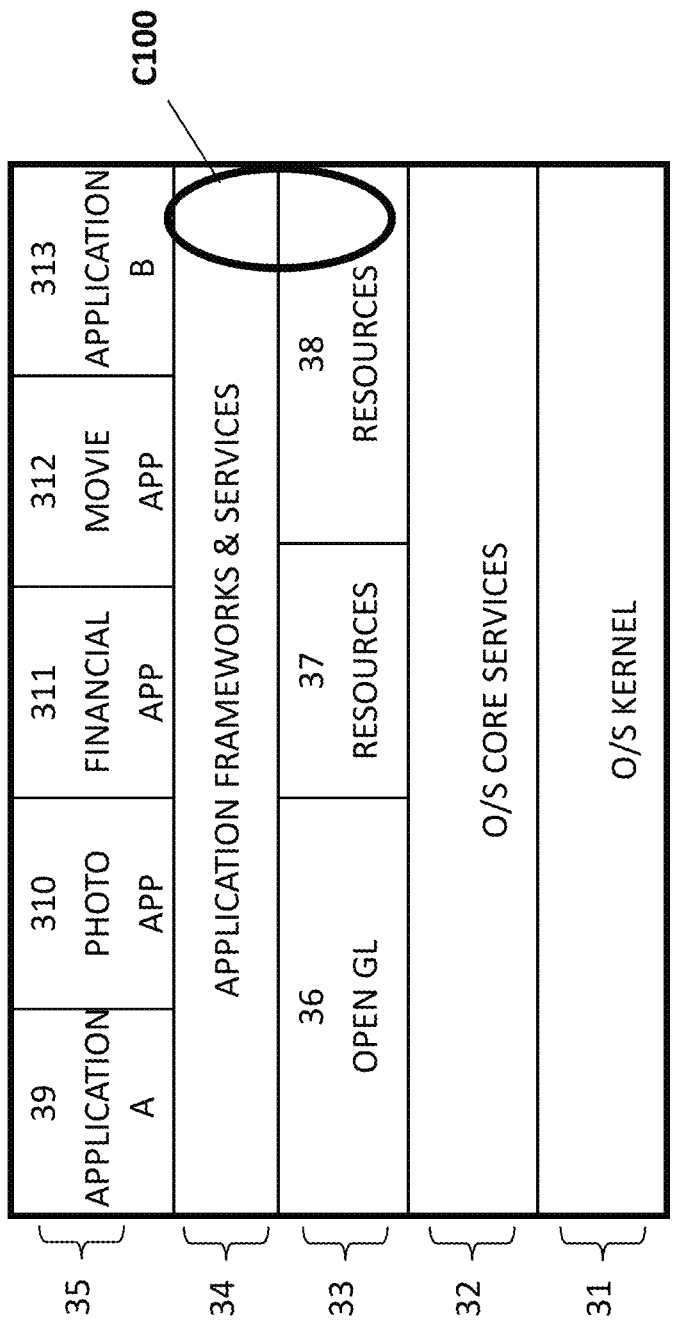
FIG. 3 shows representative software architecture.

With those caveats regarding software, referring to FIG. 3, layer 31 is the O/S kernel, which provides core O/S functions in a protected environment. Above the O/S kernel is layer 32 O/S core services, which extends functional services to the layers above, such as disk and communications access. Layer 33 is inserted to show the general relative positioning of the Open GL library and similar application and framework resources. Layer 34 is an amalgamation of functions typically expressed as multiple layers: applications frameworks and application services. For purposes of our discussion, these layers may provide high-level and often functional support for application programs that reside in the highest layer, shown here as item 35. Item C100 is intended to show the general relative positioning of framework software that may perform the image and contextual analysis discussed herein. In particular, in some embodiments, the image analysis and/or image capture techniques discussed herein may be performed by framework software through the use of an application programming interface. In certain embodiments, the framework software (or other software) accessible through an API may observe user behaviors and sensor reading (e.g., context) and may use this information to evaluate images and make conclusions about the images, for example resulting in trimming. Of course, an application program may also perform the same functionality without the aid of a framework. Furthermore, on the server side, certain embodiments described herein may be implemented using a combination of server-application-level software and database software, with either possibly including frameworks and/or a variety of resource modules. In some embodiments, servers may be accessed over a network to perform the image processing on images captured by portable devices.

Figure 4A:
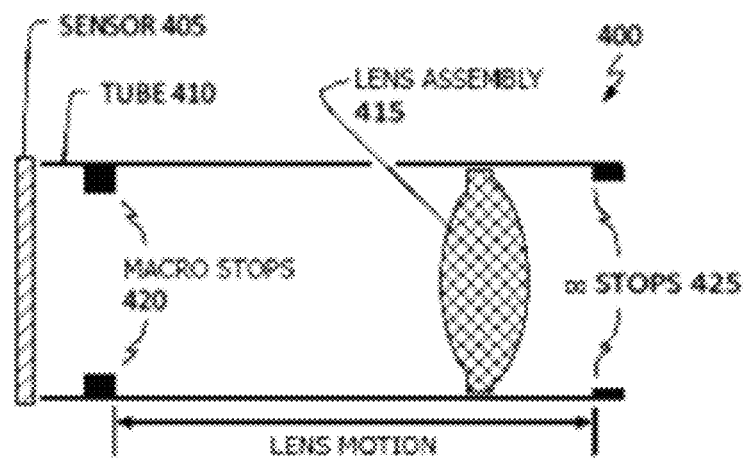
FIGS. 4A, 4B, and 4C illustrate camera and/or lens information.
Figure 4B:
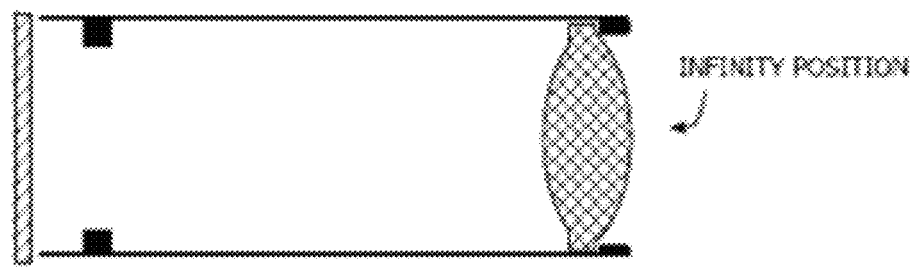
Figure 4C:
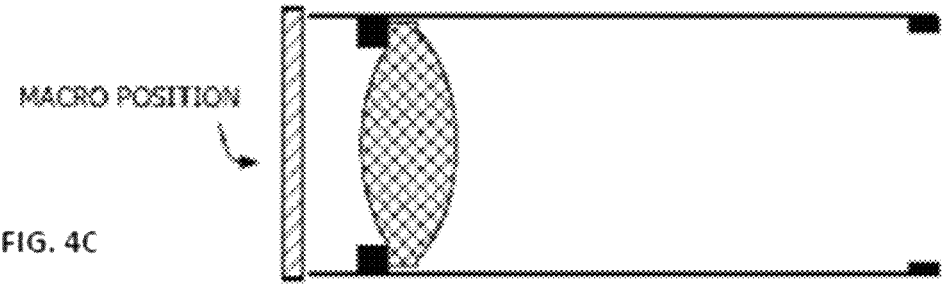

Before introducing a first embodiment, it may be useful to review a typical camera's structure vis à vis lens movement and sensor function. Referring to FIG. 4A, capture assembly 400 can include image sensor 405, lens tube 410, lens assembly 415, macro stops 420, and infinity (∞) stops 425. In this disclosure, the terms "lens" and "lens assembly" are taken to be synonymous. As such, the term lens can mean a single optical element or multiple elements configured into a stack or other arrangement Referring to FIG. 4B, when lens 415 is against infinity stops 425, all objects beyond a first distance will be in focus (hereinafter referred to as the "infinity distance"). Referring to FIG. 4C, when lens 415 is against macro stops 420, imaging assembly 400 may focus on objects as close as a second distance (hereinafter referred to as the "macro distance"). During autofocus operations, lens 415 may be moved from one end of tube 410 to the other, stopping to capture an image at a specified number of locations along the way. The locations at which lens 415 stops may be uniformly or non-uniformly distributed between the two sets of stops (macro 420 and infinity 425). One of ordinary skill in the art will recognize that a particular camera's macro and infinity distances, as well as the number of lens positions used during autofocus operations, can depend on the camera's specific design. In addition, a skilled artisan will understand the varying capabilities of image sensors, for example, with respect to light sensitivity, distortion ratios and/or capturing a maximum number of frames per second.

No limitation is intended by these hardware and software descriptions and the varying embodiments of the inventions herein may include any manner of computing device such as Macs, PCs, PDAs, phones, servers, or even embedded systems.

Enhanced Images

Embodiments of the disclosure are directed towards the capture of images and the processing of those captured images to create an enhanced visual image. Some embodiments may create an enhanced visual image that incorporates motion of visible items in the image. In some embodiments, the motion may appear to occur in the entire image, for example a 1.5 second looped view of a person swimming in a pool. In other embodiments, only a portion of the image will exhibit movement; for example, a portrait that has motion only to show the subject forming a smile or the movement of background scenery, such as rolling waves.

Many embodiments of the invention are directed toward all or part of the process of producing enhanced images by capturing image and other sensor data before and/or after a user snaps a photo (e.g., indicates a desire to capture a still image). In other words, many embodiments of the disclosure relate to a user operating a camera in a still image mode and indicating a desire to capture an image that is previewed on a display screen. Several embodiments of the invention capture image and other information (such as sensor information) for a period of time both before ("pre-capture") and after ("post-capture") the user's desired snapshot. This extra data may be conceptualized as video data or simply sequential frames. Furthermore, the information captured during the pre-capture and/or post-capture periods may be used to create enhanced images, which are simply images that provide a more rich sensory experience than an ordinary digital still.

High-Level Process to Create Enhanced Images

Figure 5:
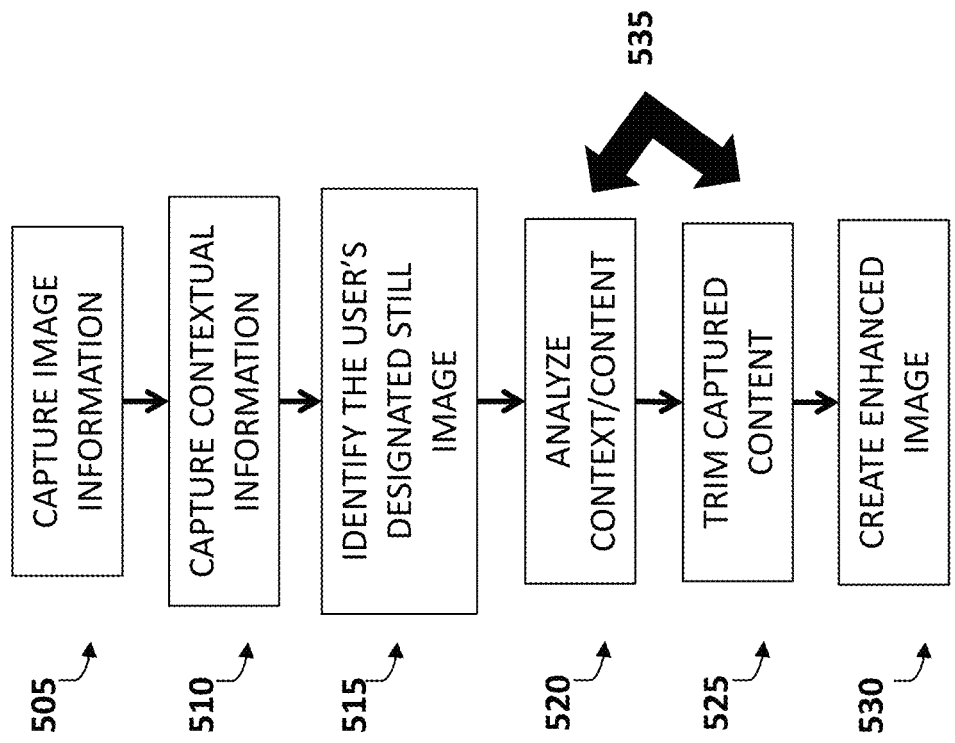
FIG. 5 shows an exemplary process associated with some embodiments of the disclosure.

Referring to FIG. 5, there is shown a process for creating enhanced images. While some embodiments of this and other processes may contemplate and order of operations, no strict order is intended by this disclosure or generally by the inventions hereunder. At 505, image information may be captured and, at 510, contextual information may be captured. In order to create an enhanced image, some information must be captured in addition to ordinary pixel values for a still image. In some embodiments, captured image information will be augmented with all or some of the contextual information available on the host device. This may include: all available camera data; all available sensor data (e.g., from the sensors discussed above); all information and data from applications and libraries residing upon the same host device (e.g., the status of an application at the time an image frame is captured); external contextual data received from a network such as the Internet (e.g., showing the status of an external event at the time an image frame is captured); and, user information either input by the user (into a GUI, settings, or preferences), or inferred about the user. In some embodiments, the captured information (image and/or contextual) may precede a user's indication to capture a frame. In other words, the host device may capture and retain image and contextual data for a period of time before the user hits a "capture" button on the camera or camera application. In order to effect the retention of this data, the device may always record and maintain a certain amount of this data, for example N seconds of data may be maintained on a first in/first out basis. In other embodiments the first in/first out data may only be retained while a camera/image-capture application is running and active. In yet other embodiments, the camera/image-capture may begin when a camera application is activated or when the device is in a mode where an image may be captured.

In some embodiments, the captured image information and/or contextual information may also antecede a user's indication to capture a frame. In other words, the host device may capture and retain image data and/or contextual data for a period of time after the user hits a "capture" button on the camera or camera application. In order to retain this data, the device may simply retain data for T seconds after a capture indication is made by a user.

Referring back to FIG. 5, at 515, the designated still image may be identified. The identified still image, which is referred to in this disclosure as the CS image or frame (explained below), may be simply the snapshot or still image that a user would have captured if the camera was operating as a normal still image unit. The CS image may be identified as the image in the preview area of the camera at the time (or within a threshold to the time) the user indicates a desire to capture (e.g., snaps a photo). At 520 and 525, the captured content, which may include the image data and/or the contextual data, may be analyzed and trimmed. Analysis 520 may refer to evaluating the image data and/or contextual data to determine data that is relevant to a specific enhanced image or is relevant to any number of potential enhanced images. In some embodiments, the analysis may involve determining which frames are irrelevant or likely irrelevant to the CS frame. In other embodiments, the analysis may also involve determining which frames are relevant. The trimming 525 refers to the deletion or flagging of frames other than the CS image. In many embodiments, trimming may involve deleting or flagging the pre-capture or post-capture frames from a designated (likely irrelevant frame) all the way to the end of the clip that is furthest away from the CS frame.

The two-sided arrow 535 is shown to indicate the potential iterative nature of some embodiments regarding items 520 and 525. The iteration may arise because, if more data trimming is accomplished, then less analysis work may remain (i.e., because there are fewer frames to analyze). Thus, in some embodiments, 520 and 525 may be reversed or the process may alternate between trimming and analysis (e.g., trim as soon as a determination is made for one or more frames and then continue analysis with fewer frames involved). Finally, at 530, an enhanced image may be created using the remaining or untrimmed portions of the captured image information and/or the contextual information.

In some embodiments, an enhanced archival image may be formed by a contiguous set of frames including the CS frame and/or pre-capture frames and/or post-capture frames, where there have been no deletions from the contiguous set (i.e., trimming was only performed on the outer edges). In other embodiments, an enhanced archival image may be formed by a sequence of frames including the CS frame and/or some pre-capture frames and/or some post-capture frames, where there have been deletions from middle portions of the sequence. In yet other embodiments, an enhanced archival image may be formed by a sequence of frames including the CS frame and/or some pre-capture frames and/or some post-capture frames, where one or more frames in the sequence have been modified by the software so as to create an effect. For example, in order to show a still where everything remains motionless except for smoke from a chimney, the pre- and post-capture frames may require editing (or partial merging with the CS image) so that only the smoke is changing from frame to frame.

Figure 6:
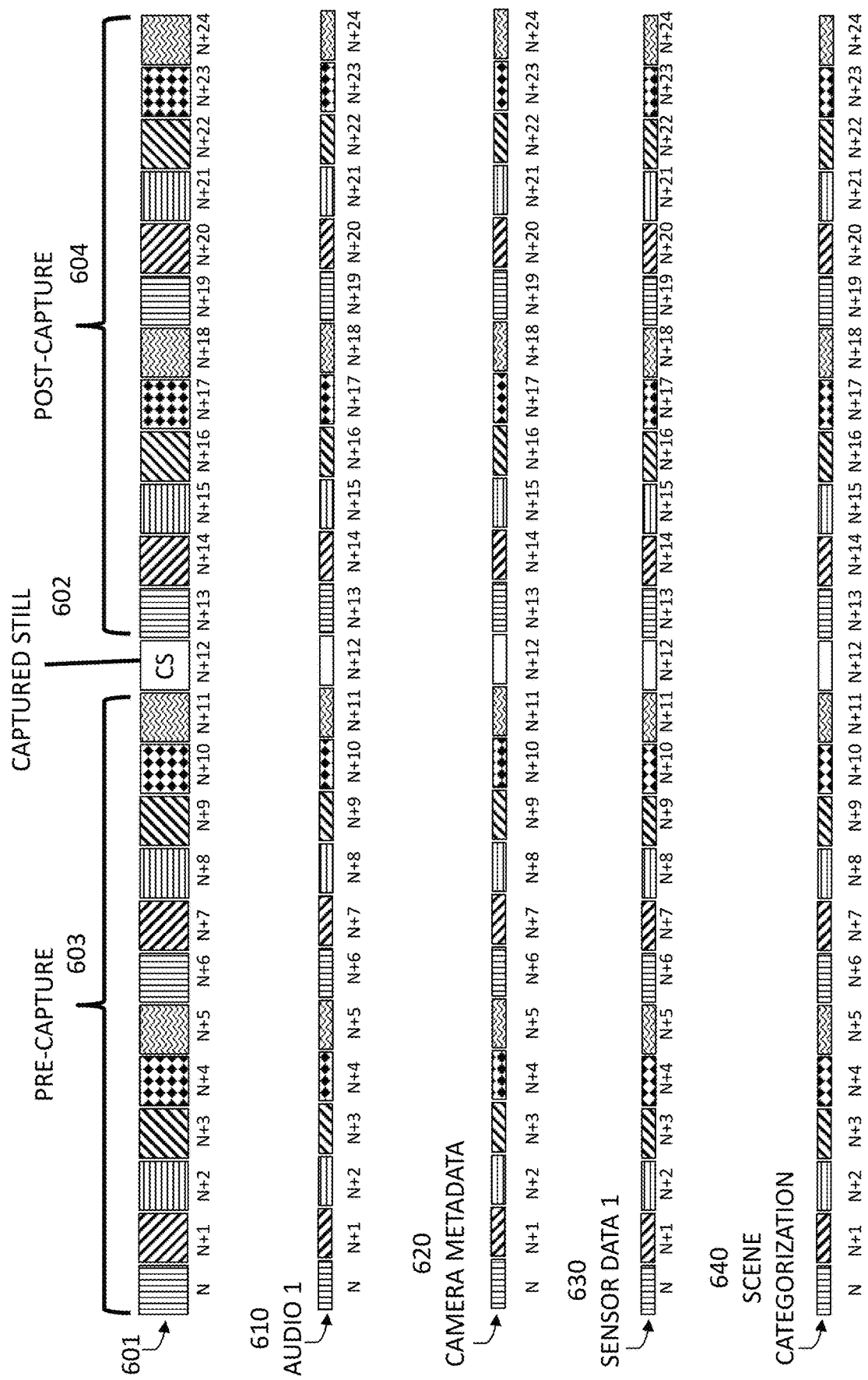
FIG. 6 illustrates exemplary captured image data and contextual information.

Referring now to FIG. 6, there is shown a conceptualization of image data 601 and contextual data 610, 620, 630, and 640. Image data 601 is illustrated as 25 frames N through N+24, where frame N+12 represents a captured still 602, which is the frame or still image that a user intends to capture through operation of a camera or camera software. Captured still 602 (the "CS" image or frame) may represent any form of a still image captured in any known manner Image data 601 also shows pre-capture frames 603, which are shown to include frames N through N+11. Pre-capture frames 603 represent image information that is collected temporally prior to the capture of the CS frame and potentially prior to the user snapping the photo. Depending upon the embodiment, pre-capture frames may represent video information in any known form and/or a rapid sequence of stills, such as 5 fps, 10 fps, 15 fps, 120 fps, 150 fps, or higher. Whether or not the pre-capture frames are collected as interleaved video or frame sequences, they may be conceptualized as a sequence of frames and will be discussed as such herein. Image data 601 further shows post-capture frames 604, which are shown to include frames N+13 through N+24. Post-capture frames 604 represent image information that is collected temporally after the capture of the CS frame. Like the pre-capture frames 603, depending upon the embodiment, post-capture frames 604 may represent video information in any known form and/or a rapid sequence of stills, such as 5 fps, 10 fps, 15 fps, 120 fps, 150 fps, or higher. Furthermore, whether or not the post-capture frames are collected as interleaved video or frame sequences, they may be conceptualized as a sequence of frames and will be discussed as such herein.

Viewed together, the image data 601 represents a temporal sequence of image information with a user-chosen still image separating a number of pre-capture frames 603 and a number of post-capture frames 604. Depending upon the embodiment, the overall temporal length of image data 601 may vary from a fraction of a second to several minutes. One particular embodiment uses 1.5 seconds of video on each side of the CS image. The contemplated embodiments do not require an equality of size, length, or format between the pre- and post-capture segments, although designers may find balance convenient.

Referring again to FIG. 6, there is also shown a number of tracks 610, 620, 630, and 640 that align with image frames from image data 601. The tracks 610, 620, 630, and 640 may carry contextual data for the image data 601 and may be drawn to conceptualize traditional media tracks that align, for example, voice and/or metadata, with images. However, some embodiments of the disclosure may not employ traditional track-based mechanisms for storing contextual information and instead may use other types of storage, such as a database. The particular contextual information tracks illustrated in FIG. 6 are audio 1 610 (representing one of potentially many audio tracks), camera metadata 620 (representing one or more items of image metadata provided by a camera), sensor data 1 630 (representing one or more items of sensor data originating with any of the sensors discussed herein), and scene categorization 640 (representing one of potentially many types of computed/derived image analysis information that may be aligned with image data). The illustrated forms of contextual data are not intended as a limitation, and varying embodiments of the disclosure contemplate the use of any available contextual data from any source. For example, other tracks might hold information concerning faces in the frames, identities in the frames, actions in the frames (e.g., dancing, walking, running, driving, blowing out candles, etc.), particular objects in the frame (e.g., balls, bats, rackets, cars, houses, pots, pans, trays), image statistics, and/or the presence of animals, etc.

Figure 7A:
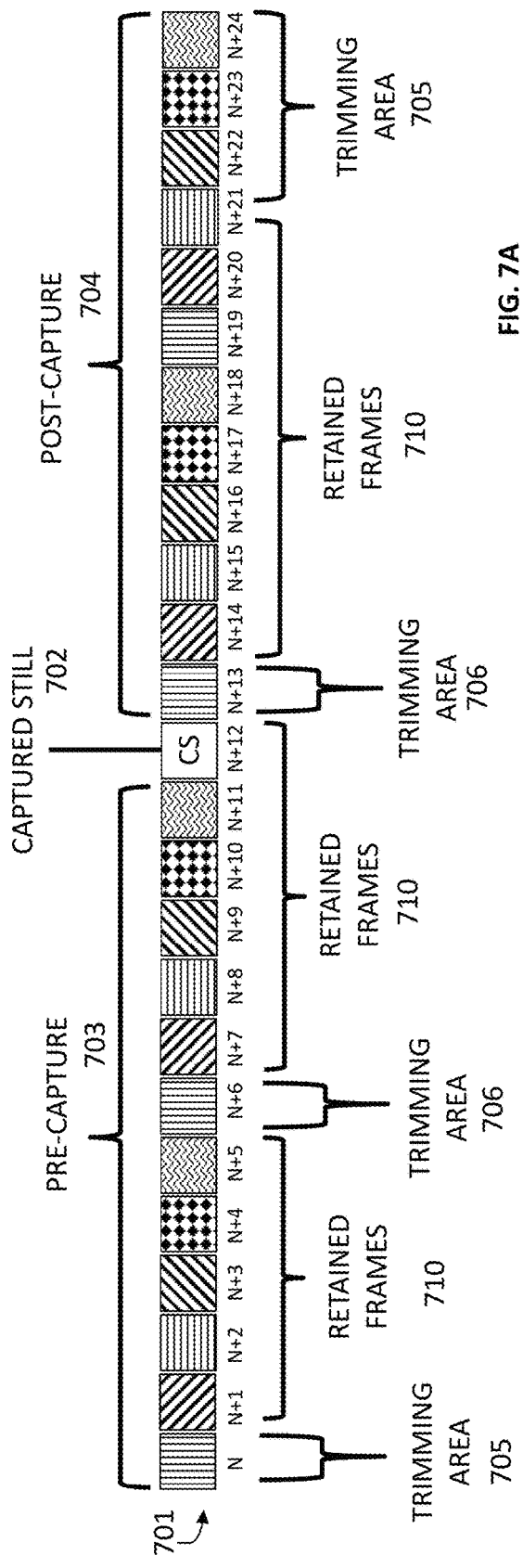
FIGS. 7A and 7B illustrate trimming of captured image data and contextual information.

Referring now to FIG. 7A, there is shown image data 701 in analogous form to image data 601 from FIG. 6. As discussed above, some embodiments of the invention contemplate trimming pre-capture segments 703 and post-capture segments 704 to eliminate irrelevant or less-relevant frames in the construction of an enhanced image. In some embodiments of the disclosure, such as that shown in FIG. 7A, frames may be trimmed from anywhere in the image data 701. Notably, trimming areas 705 are on the edges of the image data 701 and thus the deletion of the areas does not represent an interruption to retaining a contiguous temporal sequence of original frames, including the CS frame. However, trimming areas 706 sit temporally between the CS image and other frames flagged to be retained. Thus, the removal or deletion of trimming areas 706 leaves "gaps" in the retained portions of the frame sequence. This means that, if all the retained images are played in sequence without editing or alterations, a user may perceive artifacts or interruptions in the flow of the presentation. However, perception of these artifacts or interruptions may be minimized or eliminated through techniques such as image analysis and/or image editing or the insertion of transitions.

In a case where the overall retained image data portion has frame gaps due to trimming (e.g., FIG. 7A), there are several considerations that may apply (depending upon the embodiment) for using the retained portion. First, the proportion of the size of the frame gaps versus the frame rate may be considered. For example, a single missing frame from a 15 fps sequence may be noticeable but is usually not significant. By contrast, a few missing frames from a 120 fps sequence is usually unnoticeable. Second, image analysis may be performed to determine the effect—if any—of the discontinuities caused by the trimming (even if those discontinuities are proportionally noticeable). For example, if the subject of the sequence is a house with a smoking chimney, trimming may eliminate intermittent frames showing a delivery truck rolling past. However, given the nature of a smoking chimney and its proportion to an overall relatively motionless house photo, the deletion of the rolling truck frames is unlikely to raise user awareness. Any of the contextual analysis discussed herein may provide guidance on the effects of a particular gap in a particular sequence.

In addition to determining the visual significance of a gap, the use of the retained portions may be considered or altered to tolerate gaps. For example, machine-made transitions may be inserted in noticeable gaps (e.g., known video transition effects such as those used in Apple's iMovie application and other video editing programs). Alternatively, if the enhanced image is a time-lapse sequence (showing stages rather than a continuum), then the time lapse stages may be chosen around the gaps. Moreover, other uses may be derived for video sequences having gaps, such as shown in FIG. 7B.

Figure 7B:
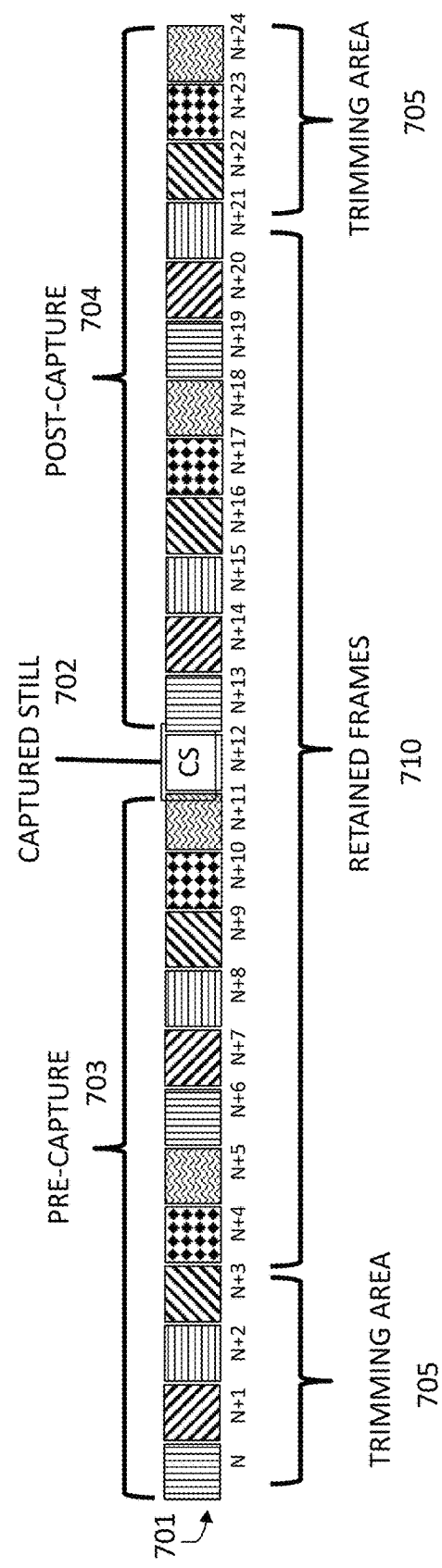

In other embodiments, such as that shown in FIG. 7B, trimming is confined to the outer edges of the pre-capture areas. In these embodiments, retained frames 710 include a full sequence of original frames, including the CS image. While some embodiments (e.g. FIG. 7A or 7B) allow for editing each retained frame to achieve an effect, embodiments under FIG. 7B have no frames deleted from the retained frames 710. By maintaining a contiguous sequence, the untrimmed portion, including captured still 702, may be used as a video loop without concern regarding a visible discontinuity. When employing some embodiments that retain only contiguous frames, it is possible that a few otherwise relevant frames may be trimmed because irrelevant frames are positioned between the captured still 702 and the otherwise relevant frames.

Trimming

In some embodiments, the user may be unaware that video is being captured. The design choice to hide the pre- and post-capture sequences from the user may have a side effect. In particular, many users, at least initially, may not be cognizant of the pre-capture 603 and post-capture 604 frames being recorded. As a consequence, the nature of the scene and/or event being captured may not align well with a predefined capture range (e.g., image data 601). For example, captured image data 601 might represent a video sequence including 1.5 seconds before and after the CS image is taken. However, a child who is the subject of the capture may have been coming down a slide and then may have run away after only 1 second. The user operating the camera or camera software will likely move the camera or put it away as soon as the subject (child) is out of the frame. In this 3-second example, 0.5 seconds of garbage frames would remain after the child runs away (the child is visible for 1 second after the CS image is captured). In some embodiments, the user may be aware of the pre- and post-capture feature, but even after experimenting with the feature, users may still misalign events with the capture period. To remedy this, some embodiments allow flexible setting of the pre- and post-capture periods through a GUI. Other embodiments may use GUI indicators to show the user when the pre-capture period starts and when the post-capture period ends. Yet other embodiments may capture pre-capture frames and context any time the camera or camera software is in an appropriate capture mode (potentially chosen from a variety of modes).

Even using the solutions described above, users may often misalign the capture periods with relevant subject matter. In addition, many of these pre- and post-capture sequences may not be framed as the user desires. For example, part of the sequence may capture the scene while the user is still adjusting the framing for the shot or bringing the camera in or out of their pocket. The problem may be compounded because, in these cases, the camera's auto-exposure may not have had time to adjust, making part of the video blown-out or overly dark. In addition, events outside the user's control, such as a person, car, or object moving temporarily in front of the camera may also detract from the desired effect of the enhanced image.

As discussed above, many embodiments of the disclosure may use automatic trimming techniques to eliminate irrelevant frames from a captured sequence. In some embodiments, hard trimming may be employed, which means that trimmed frames are actually deleted to conserve memory and other resources. Hard trimming provides for more compact enhanced images that may be better for network-based circulation, such as over the Internet. Other embodiments may employ soft trimming, where all frames are kept, but trimmed frames are merely marked or flagged as irrelevant. In some embodiments, the flagging may be by topic. For example, the same frame may be marked irrelevant for one reason, but may remain relevant for others. The "reasons" for marking can vary from the enhanced image type being used (irrelevant for continuous video), to image specific aspects (irrelevant for activity, pets, buildings, etc.). Of course, frames may also or alternatively be flagged for relevant reasons (e.g., relevant for landscapes, sunshine, children's content, etc.). Some embodiments may also employ a hybrid of soft and hard trimming. In a hybrid embodiment, an archival version of the content retains all frames and uses flagging to indicate relevance or irrelevance. However, these embodiment also offer hard-trimmed versions of each archival version, where the hard trimmed version eliminates the frames unneeded for the particular purpose. Thus, for example, a single archival version may have multiple hard-trimmed versions, each for a different purpose or project.

Brightness Trimming

In some embodiments of the disclosure, frames may be trimmed or eliminated from the retained portion due to exposure-related issues, i.e., brightness or that the frame is too light or too dark. In some embodiments, the determination regarding acceptable or non-acceptable brightness may be made by software evaluating an image or a scene. In one embodiment, software running on a processor 105 may provide information regarding two values for a given scene, where one value indicates a current level related to brightness and the other value indicate a target value related to brightness, e.g., the current brightness level and a target brightness level. In certain embodiments, the information may be derived by an auto-exposure module of the software and/or it may be separately computed for each frame or pixel.

Figure 8:
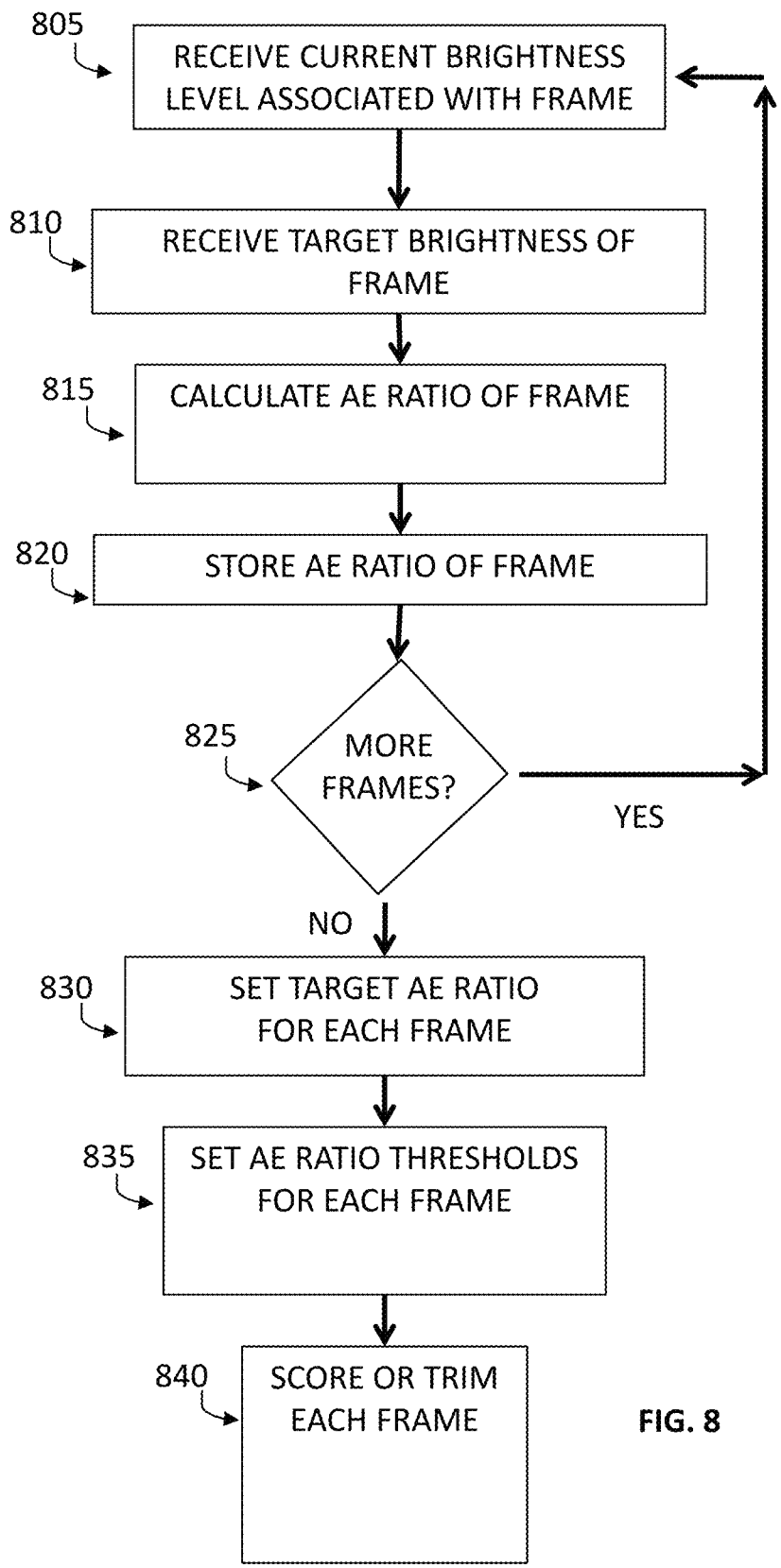
FIGS. 8 and 8A show exemplary processes associated with some embodiments of the disclosure.

Referring to FIG. 8, a process is shown as part of brightness trimming. At 805, a current or average brightness level for a scene may be received (e.g., measured or an aggregate of per pixel or other values from the camera hardware/software). The scene may be actively represented in a camera's viewfinder or represented in a previously captured frame. In some embodiments, whether the scene is alive in a camera viewfinder or represented in a stored frame, the average brightness is based upon a meter reading, software, or data from an actual exposure/capture of the frame. At 810, target brightness information may be received for a scene. The target brightness may set a level for ideal lighting in the image as determined by the camera or software. At 815, an auto-exposure ("AE") ratio may be computed by dividing the average brightness by the target brightness (or vice versa in some embodiments). The AE ratio indicates how close the current or average brightness is to the target brightness. Thus, an AE ratio of 1 may indicate that the target and the current/average brightness values are the same so that the image should not be either too dark or too light. In this scenario, if the AE ratio deviates from 1, then the image is likely too dark or too light.

Referring again to FIG. 8, at decision 820, the AE ratio for each frame may be stored. The ratio may be stored in memory in any type of data structure, such as a database or table, and associated with the appropriate frame. As illustrated with respect to FIG. 6, the ratio may also be stored as a metadata track in association with the image/video frames. At 825, a determination may be made regarding whether there are more frames to evaluate. If there are more frames, then control may return to 805 and if there are no further frames then control may continue to 830.

At 830, a target AE ratio may be set. In this example, since a value of 1 indicates a good exposure (in terms of brightness), many embodiments of the disclosure may set the target AE ratio at 1. However, if the captured still image (i.e., the CS image 602 or 702) has an AE ratio that is not close to 1, then the target AE ratio may be selected with respect to the CS image. For example, if the CS image is somewhat bright, then complementary images might be targeted to be somewhat bright. Furthermore, at 835, AE ratio thresholds may be set. The purpose of the thresholds is to set a tolerance for each frame either in terms of deviation for a good brightness level (e.g., AE ratio of 1) or in terms of brightness deviation from the CS image. Thus, in some embodiments, the AE ratio threshold may be set as a selectable band around 1, as a selectable band around the AE ratio of the CS image, etc. In other embodiments, if the CS image has a poor AE ratio (e.g., too dark or too light as judged by software and/or perhaps a different set of thresholds), then there may be no use of AE ratio thresholds, i.e., all frames may be considered to have sufficiently good brightness. For example, if the CS image does not meet particular dark/light criteria, the criteria may not be applied to other frames.

At 840, a decision may be made with respect to each frame regarding a score or elimination of the frame. In particular, in some embodiments, a frame may be eliminated or flagged based upon brightness information. In these embodiments, if the frame does not meet brightness criteria, it may be eliminated or flagged. For embodiments employing items 830 and 835, the criteria may be, for example, whether the AE ratio of the frame is within the threshold(s) set. For embodiments that do not employ items 830 and 835, other criteria may be used to determine acceptable brightness for each frame. The other criteria may depend upon any of the factors discussed herein, including scene categorization, any sensor readings, etc.

At 840, rather than eliminate frames based upon brightness, some embodiments of the disclosure merely provide a brightness rating for each frame based upon the extent of its suitability. The rating may be combined with other analyses regarding the frame to make an ultimate decision regarding the disposition of the frame as trimmed or not. For example, in embodiments of the disclosure that do not allow for gap deletions (i.e., requiring a single contiguous sequence of frames in the remaining portion after trimming), a frame may be eliminated based upon the contiguous requirement even if brightness is adequate.

Other brightness considerations regarding a decision to trim (i.e., eliminate) or score a frame include the following: the ability to use a flash or torch during the CS image capture, or during the entire capture, the use of a flash in a captured CS image as compared to surrounding frames, a count of hot pixels (overexposed according to the sensor/firmware) in each frame, and color histogram information for each frame (e.g., provided by the sensor/firmware) because certain histogram patterns indicate washed out images. In addition to brightness, there are yet other considerations, which may bear on frame elimination or scoring, such as: other auto-adjustments to the capture (such as auto-focus and auto-white-balance) that indicate poor content; focus scores (indicating blurriness); and hue or tone in view of the lighting saturation, which may indicate a poor image.

Trimming Based Upon Focus, White Balance, and Other Parameters

In other embodiments, the same process shown in FIG. 8 may be applied to other camera criteria, such as white balance or focus. Thus applying the process of FIG. 8 to these other criteria may similarly involve: a current and target value 805 and 810, a ratio of the values 815, potentially a target ratio 830, potentially target thresholds for the ratio 835, and a score or trim decision 840. The skilled artisan can easily adapt FIG. 8 to other image criteria that are subject to target values and actual/current values.

Trimming Based Upon ISP Metadata

Figure 8A:
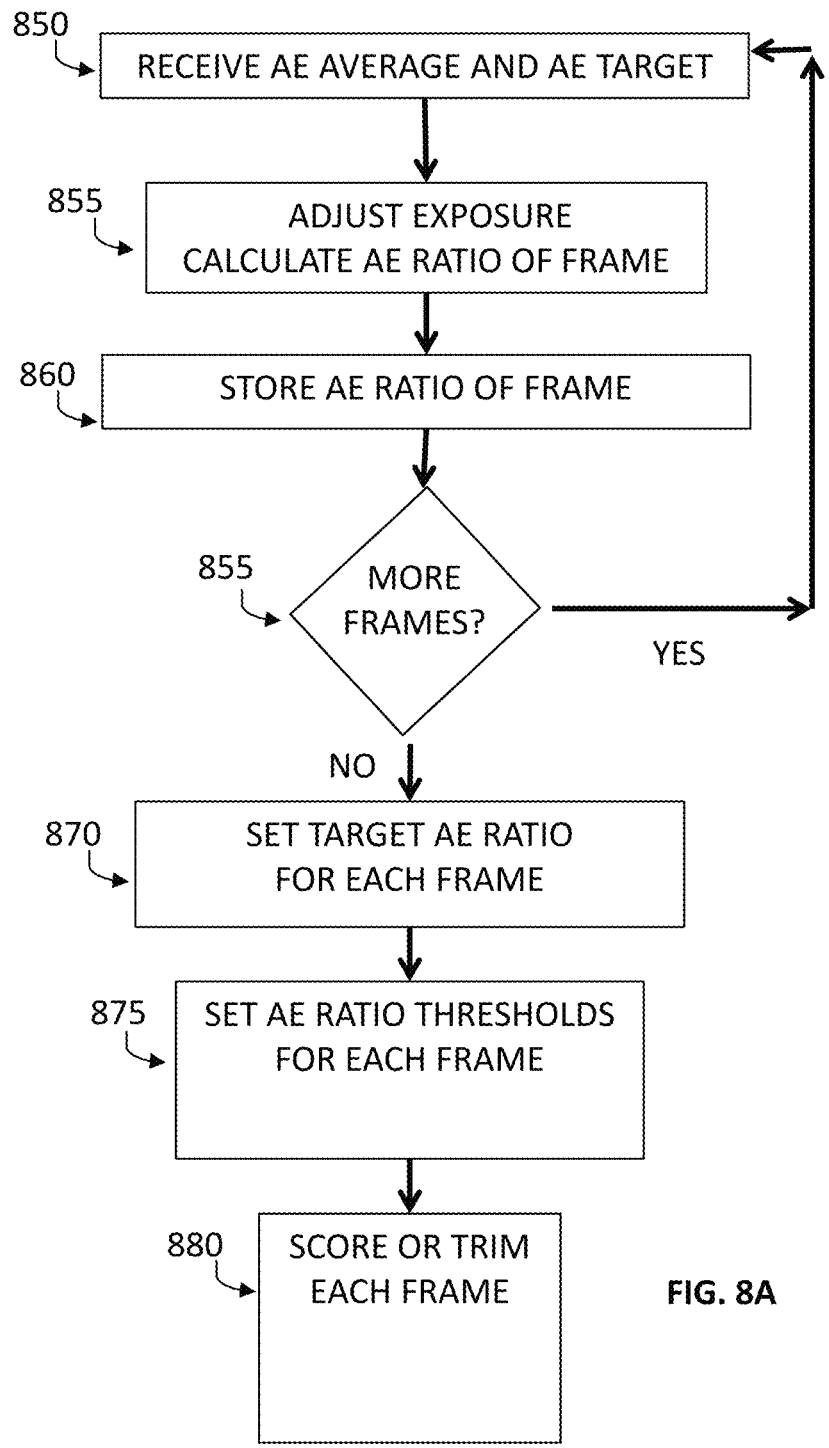

Referring now to FIG. 8A, an alternative trimming process is shown. At 850, an AE Average and AE Target value may be received, for example, from the auto exposure portion or algorithm associated with an image signal processor. In some embodiments, the AE Average and AE Target may be metadata produced by software or hardware such as an auto exposure algorithm and/or an image signal processor (represented in hardware or software). In these embodiments, the AE Target may indicate a target brightness, such as 18% brightness, although the target brightness may vary depending upon the scene (e.g. exposure levels may depend upon contents of the scene such as one or more large faces or a high key or low key scenario). In addition, in these embodiments, AE Average may be computed by a weighted average of the luma channel of a particular frame. For example, the average brightness may represent AE Average in some embodiments.

Referring again to FIG. 8A, at 855 the camera's exposure control may optionally adjust exposure so that AE Average becomes closer to AE Target. In some embodiments, the adjustment attempts to make AE Average as close to AE Target as the camera is able. Using the adjusted AE Average and in some embodiments, any updated value of AE Target, a ratio of AE Average to AE Target is calculated (e.g. AE Average/AE Target). In these embodiments, the AE ratio indicates how well exposed the frame may be, given the camera's attempt to correct exposure. Thus, an AE ratio of 1 may indicate that the brightness of the frame is good or desirable, while an AE ratio deviating materially from 1, likely indicates the frame is too dark or too light and can't be corrected by the camera (e.g. through the use or exposure control).

Referring again to FIG. 8A, at 860, AE ratio for each frame may be stored. As discussed in the prior embodiments, the ratio may be stored in memory in any type of data structure, such as a database or table, and associated with the appropriate frame. Also, as illustrated with respect to FIG. 6, the ratio may also be stored as a metadata track in association with the image/video frames. At 855, a determination may be made regarding whether there are more frames to evaluate. If there are more frames, then control may return to 850 and if there are no further frames then control may continue to 870.

At 870, a target AE ratio may be set. In this example, since a value of 1 indicates good brightness, many embodiments of the disclosure may set the target AE ratio at 1. However, if the captured still image (i.e., the CS image 602 or 702) has an AE ratio that is not close to 1, then the target AE ratio may be selected with respect to the CS image. For example, if the CS image is somewhat bright, then complementary images might be targeted to be somewhat bright. Furthermore, at 835, AE ratio thresholds may be set. The purpose of the thresholds is to set a tolerance for each frame either in terms of deviation from good brightness (e.g., AE ratio of 1) or in terms of brightness deviation from the CS image. Thus, in some embodiments, the AE ratio threshold may be set as a selectable band around 1, as a selectable band around the AE ratio of the CS image, etc. In other embodiments, if the CS image has a poor AE ratio (e.g., too dark or too light as judged by software and/or perhaps a different set of thresholds), then there may be no use of AE ratio thresholds, i.e., all frames may be considered to have sufficiently good brightness. For example, if the CS image does not meet particular dark/light criteria, the criteria may not be applied to other frames.

At 880 and as discussed above with respect to FIG. 8, a decision may be made with respect to each frame regarding a score or elimination of the frame. Furthermore, as illustrate above, rather than eliminate frames based upon brightness, some embodiments of the disclosure merely provide a brightness rating for each frame based upon the extent of its suitability. The rating may be combined with other analyses regarding the frame to make an ultimate decision regarding the disposition of the frame as trimmed or not. In addition, as discussed earlier, other considerations regarding a decision to trim (i.e., eliminate) or score a frame include the following: the ability to use a flash or torch during the CS image capture, or during the entire capture, the use of a flash in a captured CS image as compared to surrounding frames, a count of hot pixels (overexposed according to the sensor/firmware) in each frame, and color histogram information for each frame (e.g., provided by the sensor/firmware) because certain histogram patterns indicate washed out images. In addition to brightness, there are yet other considerations, which may bear on frame elimination or scoring, such as: other auto-adjustments to the capture (such as auto-focus and auto-white-balance) that indicate poor content; focus scores (indicating blurriness); and hue or tone in view of the lighting saturation, which may indicate a poor image.

Trimming Based Upon Motion Sensors

Some embodiments of the disclosure contemplate the use of camera motion as a contextual factor to aid in the determination of frame trimming Conveniently, many handheld devices, such as phones, have incorporated cameras and motion sensors, such as accelerometers and gyroscopes. Furthermore, many devices also incorporate GPS, which may be used to detect larger motions or higher speed motion, such as driving in a car. When a camera is incorporated in the same devices as the sensor, the motion of the camera is revealed by the sensor readings, which may be used to characterize camera movement.

Camera movement may be useful in making trimming decisions because the sensed movement may be compared to the expected movement for useful frame sequences or irrelevant sequences. For example, during camera usage, irrelevant sequences may be captured when moving the camera in and out of storage (e.g., a pocket) or during certain framing activities (e.g., rotating the view). Alternatively, frame sequences found during panning or movement toward or away from the subject (essentially zooming by movement) may be either useful or irrelevant.

Figure 9:
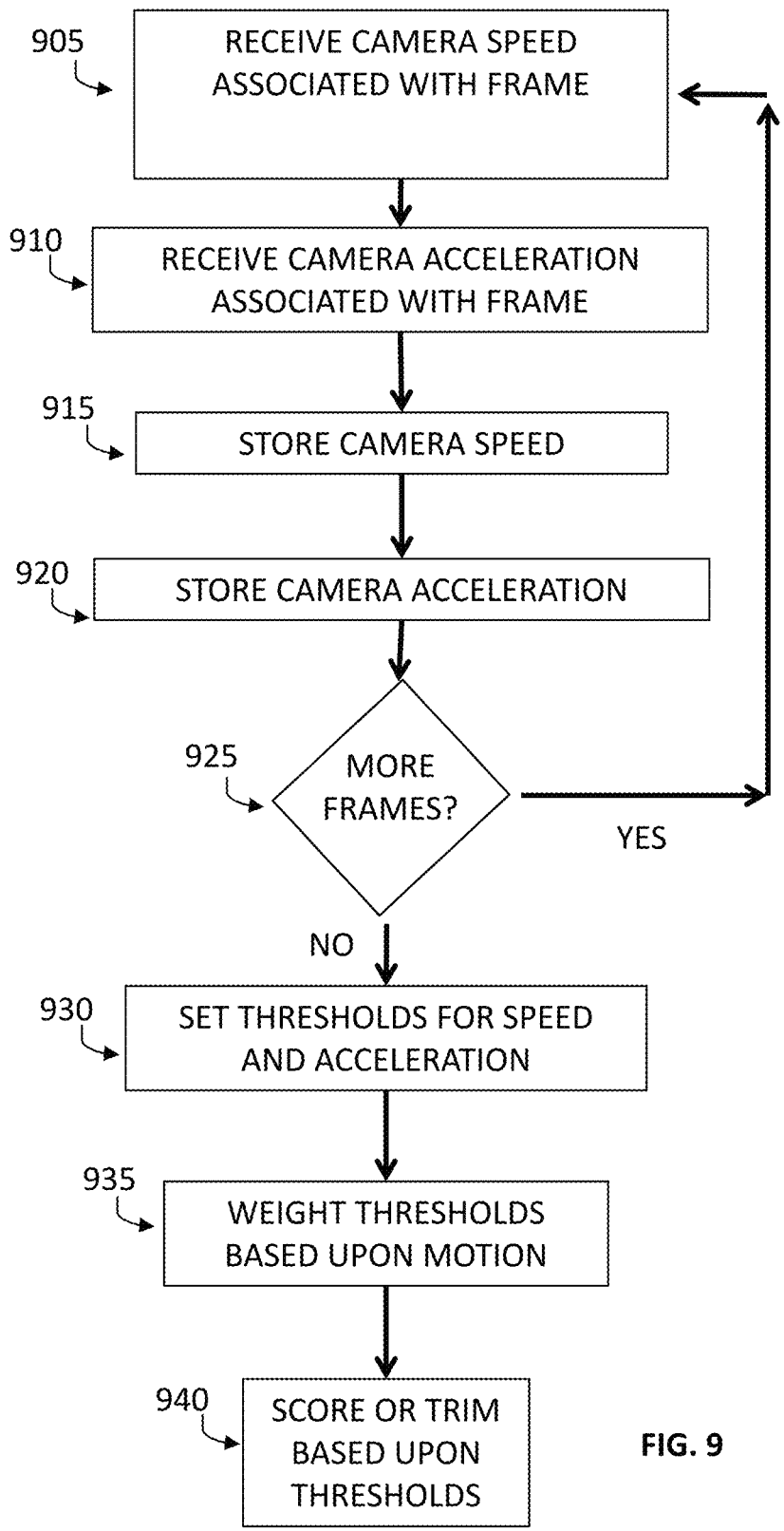
FIG. 9 shows an exemplary process associated with some embodiments of the disclosure.

Referring to FIG. 9, a process is shown illustrating aspects of motion trimming. At 905, camera speed or velocity information may be received for a frame. The speed or velocity information may be sourced from any sensor or a combination of sensors such as an accelerometer, a gyroscope, and GPS. At 910, a camera acceleration may be received for a frame (e.g., from one or more of the same sensors). At 915 and 920, the speed/velocity and acceleration information may be stored. The information may be stored in memory in any type of data structure, such as a database or table, and associated with the appropriate frame. In addition, as suggested in FIG. 6, the information may also be stored as a metadata track in association with the image/video frames. At 925, a determination may be made regarding whether there are more frames to evaluate. If there are more frames, then control may return to 905, and if there are no further frames then control may continue to 930.

At 930, thresholds may be set for speed and acceleration. The thresholds may be set with reference to empirical data or subjectively with the goal of flagging frames where the camera is moving too fast or accelerating too quickly: to be associated with frames that the user intended to keep or to capture useful frames. In some embodiments, the thresholds may be applied in multi-frame sequences, so that C consecutive frames must violate the threshold in order to trigger a scoring or trimming. In one embodiment, using a 15 fps capture rate, 2 consecutive frames violating a threshold may trigger a scoring or trimming. Furthermore, depending upon the embodiment (and as discussed above), a failed threshold may result in trimming only the failing frames, or alternatively trimming the entire clip from the failing frames to the edge of the clip furthest away from the CS frame (i.e., the pre-capture edge or the post capture edge).

At 935, the thresholds may be optionally weighted based on a characterization of the sensed motion of each frame relative to the CS frame. In some embodiments, if the motion of a non-CS frame is orthogonal to the motion of the CS frame, the scenario may be considered adverse (e.g., a return of the camera to the user's pocket) and the threshold may be weighted to make trimming or scoring more likely or even certain. Alternatively, if the direction of motion of a non-CS frame is consistent with the motion direction of the CS frame (e.g., if the camera is panning or moving with the subject), the thresholds may be weighted to make scoring or elimination less likely.

At 940, a decision may be made with respect to each frame (or group of frames for multi-frame analysis) regarding a score or elimination of the frame(s). In particular, in some embodiments, frames may be eliminated based upon criteria for movement and if the frames do not meet movement criteria, they may be eliminated. In other embodiments, if the frames do not meet the criteria, the entire clip may be trimmed from the failing frames to the edge of the clip furthest from the CS frame. For embodiments employing item weighting 935, the criteria may be weighted with respect to other factors, such as movement direction, scene categorization, and/or any other sensor readings.

At 940, rather than trim or eliminate frames or clips based upon movement, some embodiments of the disclosure merely provide a movement rating for each frame based upon the movement criteria. The rating may be combined with other analyses regarding the frame to make an ultimate decision regarding the disposition of the frame as trimmed or not.

In some embodiments, weighting 935 or other techniques may be used to influence the trimming or scoring result in order to mitigate incorrect results. For example, statistics may be computed regarding camera motion in order to avoid inappropriate false indications of irrelevant frames. In one embodiment, the weighting process is altered to incorporate the situation of photographing while driving or using other large machines. The compensation accounts for vibrations and camera motion orthogonal to the scene when the balance of movement is in concert with the scene. By analyzing the movement signal and applying empirical statistics, many false readings may be avoided.

In other embodiments, weighting 935 may similarly be used to de-rate frames, thereby increasing the probability of scoring or trimming. For example, in some embodiments, motion sensors may be used to detect a change in camera orientation. If the orientation of a non-CS frame differs from that of the CS frame, some embodiments may trim or score the frame so it is eliminated or so the probability of deletion is increased. In other embodiments, if the user is dramatically rotating the device, perhaps to frame a shot as landscape when initially in a portrait orientation, the motion results in noticeably undesirable video frames. These frames may appear sideways or perhaps even upside-down compared to the CS frame. The movement of the frames may be undesirable and may be visually unsettling so the frames should be de-rated (either causing their certain trimming or increasing the probability). Since many camera devices already detect changes in orientation and other characteristics, and attach metadata to images indicating the orientation and other characteristics at capture time, these types of optimizations may be applied with less original programming Trimming Based Upon Image Analysis In some embodiments, image analysis may be used as a factor for scoring or trimming frames. Image analysis involves an investigation of the content of the image— generally components that are visible to a user. For example, in analyzing a single image faces may be detected and/or identified, objects may be identified, quality parameters may be assessed (e.g., blurriness, sharpness, etc.), and/or the scene may be categorized (i.e., as beach, sports, portrait, landscape, etc.). When multiple images are analyzed together, image analysis may include comparison of the images, such as image registration (where image features or even metadata are aligned across multiple images). This type of image analysis allows software to detect, for example, an unwanted person walking in front of the camera, or other visual disturbances that are not detectable by analyzing camera motion or exposure levels. Multi-image analysis also may be used to reinforce conclusions from single image evaluation, such as object or face identification.

In some embodiments, image analysis may be used to make determinations regarding trimming or scoring frames. In some embodiments, frames having viewable faces may be retained or scored for higher probability of retention. In other embodiments, if faces are identified (using software with pre-identified individuals), the frames may be retained or scored for higher probability of retention. In yet other embodiments, other identifiable factors may be used to rate or trim frames, including, but not limited to: pets; identifiable pets; facial expression; object/subject identification; scene categorization; and/or other intelligent conclusions software may make through image analysis.

Some embodiments of the disclosure may employ a multi-factor indicator for image analysis that may be used to influence trimming or scoring decisions. In one embodiment, the factors may be chosen from the following: sharpness of frame; focus score for frame; white balance of the frame; the presence of animals; the presence of an identifiable pet; the presence of faces; the presence of the same faces in sequential frames and the number of sequential frames; classification of facial expression in present faces; the identity of objects/subjects; the scene classification of a frame; the scene classification of sequential frames and the number of sequential frames; and any combination thereof. In a typical multi-factor analysis, each factor may contribute a normalized score, and all the scores may be combined (e.g., summed) to form a single indicator. The indicator may then be applied to a threshold or a band of thresholds to determine the scoring or disposition of the frame or frames. For example, if the indicator exceeds the threshold, the frame or frames might be retained or trimmed. Alternatively, if the indicator falls within a specific band, it may be given a certain image analysis score, and if it falls within a different band, it may be given a different image analysis score. The image analysis score may then be combined with other factors to produce a disposition for a frame or frames.

In some embodiments, the disclosure contemplates a three-component indicator, for exemplary purposes called a "garbage" indicator. The components of the garbage indicator may include: camera travel distance as derived from frame registration; blurriness/sharpness; and image quality assessment based upon frame registration analysis. The components of the garbage indicator may each be normalized and then combined together by simple summing or by any known mathematical principle.

In one embodiment employing the garbage indicator, the frame registration used to compute the camera travel distance may be a translation-only registration, which results in a 2D vector. The 2D vector is intended to represent the optimal translation of a first frame so that its content corresponds with a second frame. The embodiment may optionally use a pixel-sum-based approach, wherein the luminance of the pixels is summed along each row and column of the image to create a "signature" or "projection" of the pixels in a single dimensional signal. This single dimensional signal may contain one value per row (or column) for each row-sum (or column-sum) of the image. In some implementations, two signals may be derived: one for the rows and one for the columns. The registration in the vertical direction may be found by matching the row sums from a first image/frame with the row sums from a second image/frame. The matching may be performed by sliding one signal past the other and computing differences. In addition, a Y translation may be provided and, in one embodiment, may be the point where the sum of differences is minimized. Similarly, an X translation may be computed using the column sum signals (i.e., where the differences are minimized). The camera travel distance may then be determined as the magnitude of the resulting vector (i.e., the X and Y translations).

Other embodiments of the disclosure contemplate different derivations for camera travel distance. In some instances, a more computationally intense method may be employed, such as determination of an affine or full-homographic transform to match one image/frame to another image/frame. These more intense techniques may use outlier-rejection methods for determining feature correspondences between the two images, where the features may be computed from pixel intensities (example techniques include Harris Corners, SIFT, and Histogram of Oriented Gradients). Depth information may also be employed if the camera is associated with a depth sensor or can otherwise acquire the depth information.

The second component of the illustrative garbage indicator may be a blurriness/sharpness indicator. To determine blurriness/sharpness, one embodiment may employ a wavelet-based method, which uses categories of cross-band coefficient comparisons that are likely to be caused by blurry edges. Other embodiments may use other techniques, such as: gradient-based methods; edge-width methods; local contrast methods; unsharp masking energy methods; natural image statistics methods; entropy-based methods; etc. Virtually all blur/sharpness determination techniques carry trade-offs between accuracy and computational complexity/burden.

The third component of the illustrative garbage indicator is an image quality assessment based upon the translated registration result. In one embodiment, the third factor may be the skewness parameter, which may be determined as follows. With reference to the registration technique discussed with respect to the first garbage indicator factor, the absolute difference values from the row and column sums at the optimal X and Y translation are collected and used to create a MAP (maximum a posteriori probability) estimate to a standard normal distribution. This embodiment employs the first three modes of this standard normal distribution as the mean, the standard deviation, and skewness, respectively. In some implementations, however, the distribution of difference values may be highly non-Gaussian, making the standard normal distribution a less accurate model. Nonetheless, the skewness mode of the estimate provides an indication of the quality of the estimate and may be used accordingly.

In many implementations, in instances that have local motion or reasonably accurate registration, the skewness will be high. This is because there is a long tail of larger errors due to image-subject motion, which causes objects in the scene to become either visible or hidden. Other errors may arise from registration areas where the image matches will be very small. If the registration is poor, or the image content changes so dramatically that a good translation estimate is very difficult, the distribution of errors becomes far more random, and the skewness becomes small.

Once the three garbage indicator factors have been determined, each may be normalized by any mechanism known to the skilled artisan. In some embodiments, the normalization may be based on statistics, where the statistics may be related to the CS image/frame and/or its immediate surrounding frames. In one embodiment, the mean and standard deviation may be calculated for each factor and relating to F frames on each side of the CS image. In some instances F may be chosen as 25-40% of the available frames (e.g., if there are 17 frames on the post-capture side, then 33% will be approximately 5 frames). Having the mean and standard deviations, each factor may be normalized to zero mean and unit standard deviation by subtracting the mean and dividing by the standard deviation. In some embodiments, the standard deviation may also be constrained for each value, so that the values are not overly attenuated or overly amplified by unusually large or small variations near the still capture frame.

In one embodiment, once all three values are normalized, the garbage indicator may be computed as camera travel distance+blur amount−skewness. The garbage indicator may be employed by comparing it against one or more thresholds. For each threshold, a minimum skewness value may be required, which effectively guarantees a minimum impact for the skewness factor in the overall garbage indicator. If the minimum skewness value is met, and the threshold is surpassed, then the video frame is classified as garbage, i.e., it should be excluded. In some embodiments, a single garbage frame may be ignored, but if two consecutive garbage frames are encountered, the frame sequence is trimmed from that point to the end furthest from the CS frame.

The garbage indicator embodiment is designed for expedient processing (e.g., fast execution time). Other embodiments of the disclosure contemplate more sophisticated image analyses. For example, object tracking methods can be used to identify foreground moving objects and characterize their motion, which can be useful for understanding when such objects may enter or exit the scene and/or to provide a focus area for blur and sharpness evaluations. As another example, image-understanding methods based on machine learning may also provide helpful image analysis, such as in the case of scene classification. In one instance, if part of the video was classified as indoors while the rest was classified as outdoors, the classifications may add to the trimming determination. In particular, if the CS image is classified as indoors, some embodiments may only retain the indoor portions (e.g., frames or sequential segments) of the non-CS frames.

Yet another example of more complex image analysis is face and/or identity detection, including emotion or expression detection. In a sample instance, the CS image may contain a smiling face, while most of the post capture sequence shows an expression of sadness or disgust. In this instance, some embodiments may trim the sequence or frames containing the expression of sadness or disgust.

Trimming Based Upon Sound/Audio

In some embodiments, audio may be used to help inform a trimming or scoring decision. In one embodiment, if speech is detected, associated frames are not trimmed or eliminated in such a way that the speech is interrupted. In other embodiments, intelligent speech recognition may be used to determine the relevance of the speech, which may be used to influence trimming or scoring determinations. Other types of sounds are also useful in many embodiments. For example, sounds such as cheering crowds or sharp bangs can indicate importance to one or more associated frames. Since crowds often cheer right after a great sports play, the cheering sound can be used to indicate where the great play ended. Also, large bangs or other burst-like loud sounds are likely to correspond to something of interest, such as a firework exploding. Thus, some embodiments may retain frames associated with these sounds or may score the frames so they are more likely to be retained.

Trimming Based Upon Other Metadata

In many embodiments, a variety of other useful metadata may be attached to images/frames. The metadata may be obtained or computed from, for example the camera sensor, other sensors in the device, and/or processing units in the device. Generically, available data may be derived from known device capabilities (e.g., time of day, location) or other algorithms running on the device during image capture (e.g., video stabilization or stability estimation). In one embodiment, Apple hardware is employed and the Apple platform provides a program interface for both video stabilization data and an estimate of scene stability. In some embodiments, video stabilization data may be used in lieu of image registration or sensor motion data. In addition, known techniques for estimating scene stability may provide additional information regarding how much subject motion is present. This may be used to influence trimming and scoring determinations, and in particular to improve the garbage indicator embodiment.

In some embodiments, user preferences, settings, and history logs either expressed or observed in the system may serve as further aid for trimming and scoring decisions. For example, if a user's calendar indicates a 7 AM flight, pictures captured at 7:30 are likely in an airplane and can be trimmed accordingly (i.e., interior of the plane versus brighter window view).

Other Contextual Data

Some embodiments of the disclosure contemplate the use of contextual data available through a network such as the Internet. For example, by using external data, a GPS location can be converted to a place, such as a restaurant, a ballpark, or a theater. The substantive information regarding the identity of a location may aid in trimming and scoring decisions, e.g., a small flying white object is almost certainly relevant at a baseball stadium. The same usefulness holds true for personal identities and any context that may be obtained to enrich local data, such as GPS, names, appointments, contact card information, etc.

Using Scoring

The foregoing discussion has referenced trimming or deletion as well as scoring frames for a subsequent decision regarding disposition. While, the skilled artisan will be familiar with the use of scoring systems the following example is provided. In some embodiments, each frame may accrue one or several scores based upon different factors. A group of frames, such as a sequence, may then be compared by evaluation of relative scoring. The evaluation may result in finding more and/or less relevant frames depending upon how the scores are employed. In addition, scoring offers a depth of analysis (e.g. why is the frame good or bad), that allows the relevance of a frame to be determined for a particular purpose. For example, scoring analysis may determine that the same frame is poor for a contiguous video enhanced image but good for a time lapse image.

Enhanced Images

As discussed above, many embodiments of the disclosure contemplate the creation of enhanced images. In one form, the enhanced image may be a brief video loop that concatenates all the untrimmed image data portions. There are also variations to this form that may be presented by highlighting the CS frame, both through literal highlighting (e.g., border, image effect, size, etc.) and/or by expanding the time of its presentation (e.g., presenting multiple identical CS frames to elongate the presentation of the CS frame). In addition, varying embodiments of the disclosure envision many more types of enhanced image types, which are listed below:

Video Looping Only a Fraction of the Retained Image Data Portions.

Slowing a looping video as the play head approaches the CS image and then speeding it up as the play head becomes more distant from the CS image.

Editing the frames so that a portion of the enhanced image shows motion and another portion does not (e.g., a baseball game where we only see the pitcher moving, or a house with no motion except smoke coming out of the chimney).

Varying the play time for some frames and not others.

File Types and Usage

The embodiments discussed herein may be implemented in a variety of formats including still image and video formats. In some embodiments, an enhanced image may be maintained as a group of files that may include one or more image files (e.g. RAW, JPEG, TIFF etc.) and one or more video files (e.g. H.264, MPEG etc.). In some embodiments, an enhanced image is stored as a single image file and a single video file that are associated together by, for example, metadata or a database. In one or more of these embodiments, the image file may be the CS image and the video file may be a trimmed image sequence. In other embodiments, the enhanced image may be stored as a series of associated still images and video may be played by transitioning quickly through sequential still images (e.g. 15 frames per second or more). Yet in other embodiments, an enhanced image may be stored as a single still image (e.g. the CS image) and two or more associated video files, e.g. one or more video files for the pre-capture period and one or move video files for the post capture period. In these embodiments, more flexibility is afforded for playback options such as playing only pre-capture video or post capture video. In some embodiments, the video and still image files are retained as part of an asset library. The asset library may be completely independent or associated with an application or a framework (e.g. a portion of the operating system).

A user may enjoy an enhanced image in by employing a user interface to activate image play. For example, an appropriate user interface will allow a user to view the CS image or the video or both. In one embodiment, the user displays a still image by selecting it on a touch interface from displayed list or a displayed group of images. Once a still image is displayed, an associated enhancement (e.g. video) may be viewed through another interface action by the user. For example, the user may play the enhanced feature by a press and hold gesture on a touch interface where the single finger touch upon the still image is held beyond a threshold time. In other embodiments, different gestures may be used to activate the enhanced feature. For example, a still image might be activated with one gesture type (e.g. a single figure touch) and an enhanced display might be activated by a different gesture (e.g. a multi-finger touch). Of course any known gestures may be used such as swipes, pinches, etc.

In some embodiments, a host system provides a still image and video by displaying the still image and then, when the video should be played (e.g. after receipt of a user prompt) searching for the video file (or files) by using an association between the still image and the video or videos. For example, when transitioning from a still image to an associated enhanced feature video, the host system may: find and load the video that corresponds to the still image; create a transition from the still to the first frame of the video; display the transition; play the video; create a transition from the last video frame back to the still image; display the transition; and display the still image again. In some embodiments, the transitions may be created in advance and in other embodiments they may be created at run time. In some embodiments having low frame rate play, frame blurring may be used to improve the viewing experience.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., many of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

We claim:

1. A method of producing an enhanced image comprising:
   capturing a first plurality of images, wherein the first plurality of images comprises:
      a snapshot image, wherein the snapshot image is captured in response to receiving a snapshot indication through a user interface;
      a pre-capture image sequence, wherein the pre-capture image sequence comprises a plurality of images captured prior to capturing the snapshot image, and wherein the snapshot indication is received after capturing at least one of the plurality of images of the pre-capture image sequence; and
      a post-capture image sequence, wherein the post-capture image sequence comprises a plurality of images captured after capturing the snapshot image;
   obtaining motion information for each of the first plurality of images;
   identifying a first subset of images from among the pre-capture image sequence that meet a first motion criterion, wherein the first motion criterion comprises a comparison between the motion information of a respective image of the pre-capture image sequence and the motion information of the snapshot image;
   identifying a second subset of images from among the post-capture image sequence that meet a second motion criterion, wherein the second motion criterion comprises a comparison between the motion information of a respective image of the post-capture image sequence and the motion information of the snapshot image; and
   creating an enhanced image comprising the snapshot image, the first subset of images, and the second subset of images.

2. The method of claim 1, wherein the first subset of images from among the pre-capture image sequence are identified based on a determination of whether the motion information of each of at least a first predetermined number of consecutive images of the pre-capture image sequence fails to meet the first motion criterion.

3. The method of claim 2, further comprising, in response to determining that the motion information of each of at least the first predetermined number of consecutive images fails to meet the first motion criterion, trimming from the first plurality of images: (i) the first predetermined number of consecutive images, and (ii) images from the pre-capture image sequence captured prior to the first predetermined number of consecutive images.

4. The method of claim 1, wherein the second subset of images from among the post-capture image sequence are identified based on a determination of whether the motion information of each of at least a second predetermined number of consecutive images of the post-capture image sequence fails to meet the second motion criterion.

5. The method of claim 4, further comprising, in response to determining that the motion information of each of at least the second predetermined number of consecutive images fails to meet the second motion criterion, trimming from the first plurality of images: (i) the second predetermined number of consecutive images, and (ii) images of the post-capture image sequence captured after the second predetermined number of consecutive images.

6. The method of claim 1, wherein the first motion criterion is the same as the second motion criterion.

7. The method of claim 1, wherein the first motion criterion is different from the second motion criterion.

8. The method of claim 1, wherein the first motion criterion further comprises evaluating whether a difference between the motion information of the respective image of the pre-capture image sequence and the motion information of the snapshot image is less than a first predetermined threshold amount, and the second motion criterion further comprises evaluating whether a difference between the motion information of the respective image of the post-capture image sequence and the motion information of the snapshot image is less than a second predetermined threshold amount.

9. A non-transitory computer readable medium having stored thereon a program, the program comprising one or more instructions that, when executed by a processor, cause the processor to:
   capture a first plurality of images, wherein the first plurality of images comprises:
      a snapshot image, wherein the snapshot image is captured in response to receiving a snapshot indication through a user interface;
      a pre-capture image sequence, wherein the pre-capture image sequence comprises a plurality of images captured prior to capturing the snapshot image, and wherein the snapshot indication is received after capturing at least one of the plurality of images of the pre-capture image sequence; and
      a post-capture image sequence, wherein the post-capture image sequence comprises a plurality of images captured after capturing the snapshot image;
   obtain motion information for each of the first plurality of images;
   identify a first subset of images from among the pre-capture image sequence that meet a first motion criterion, wherein the first motion criterion comprises a comparison between the motion information of a respective image of the pre-capture image sequence and the motion information of the snapshot image;
   identify a second subset of images from among the post-capture image sequence that meet a second motion criterion, wherein the second motion criterion comprises a comparison between the motion information of a respective image of the post-capture image sequence and the motion information of the snapshot image; and
   create an enhanced image comprising the snapshot image, the first subset of images, and the second subset of images.

10. The non-transitory computer readable medium of claim 9, wherein the first subset of images from among the pre-capture image sequence are identified based on a determination of whether the motion information of each of at least a first predetermined number of consecutive images of the pre-capture image sequence fails to meet the first motion criterion.

11. The non-transitory computer readable medium of claim 10, wherein the program further comprises one or more instructions that, when executed by the processor, cause the processor to:
   in response to determining that the motion information of each of at least the first predetermined number of consecutive images fails to meet the first motion criterion, trim from the first plurality of images: (i) the first predetermined number of consecutive images, and (ii) images from the pre-capture image sequence captured prior to the first predetermined number of consecutive images.

12. The non-transitory computer readable medium of claim 9, wherein the second subset of images from among the post-capture image sequence are identified based on a determination of whether the motion information of each of at least a second predetermined number of consecutive images of the post-capture image sequence fails to meet the second motion criterion.

13. The non-transitory computer readable medium of claim 12, wherein the program further comprises one or more instructions that, when executed by the processor, cause the processor to:
in response to determining that the motion information of each of at least the second predetermined number of consecutive images fails to meet the second motion criterion, trim from the first plurality of images: (i) the second predetermined number of consecutive images, and (ii) images of the post-capture image sequence captured after the second predetermined number of consecutive images.

14. The non-transitory computer readable medium of claim 9, wherein the first motion criterion is the same as the second motion criterion.

15. The non-transitory computer readable medium of claim 9, wherein the first motion criterion is different from the second motion criterion.

16. The non-transitory computer readable medium of claim 9, wherein the first motion criterion further comprises evaluating whether a difference between the motion information of the respective image of the pre-capture image sequence and the motion information of the snapshot image is less than a first predetermined threshold amount, and the second motion criterion further comprises evaluating whether a difference between the motion information of the respective image of the post-capture image sequence and the motion information of the snapshot image is less than a second predetermined threshold amount.

17. A system comprising:
one or more CPUs;
one or more cameras for capturing images; and
a memory for storing program instructions for the one or more CPUs, wherein the instructions, when executed, cause the one or more CPUs to:
capture a first plurality of images, wherein the first plurality of images comprises:
a snapshot image, wherein the snapshot image is captured in response to receiving a snapshot indication through a user interface;
a pre-capture image sequence, wherein the pre-capture image sequence comprises a plurality of images captured prior to capturing the snapshot image, and wherein the snapshot indication is received after capturing at least one of the plurality of images of the pre-capture image sequence; and
a post-capture image sequence, wherein the post-capture image sequence comprises a plurality of images captured after capturing the snapshot image;
obtain motion information for each of the first plurality of images;
identify a first subset of images from among the pre-capture image sequence that meet a first motion criterion, wherein the first motion criterion comprises a comparison between the motion information of a respective image of the pre-capture image sequence and the motion information of the snapshot image;
identify a second subset of images from among the post-capture image sequence that meet a second motion criterion, wherein the second motion criterion comprises a comparison between the motion information of a respective image of the post-capture image sequence and the motion information of the snapshot image; and
create an enhanced image comprising the snapshot image, the first subset of images, and the second subset of images.

18. The system of claim 17, wherein the first subset of images from among the pre-capture image sequence are identified based on a determination of whether the motion information of each of at least a first predetermined number of consecutive images of the pre-capture image sequence fails to meet the first motion criterion.

19. The system of claim 18, wherein the memory further stores for the one or more CPUs, program instructions that, when executed, cause the one or more CPUs to:
in response to determining that the motion information of each of at least the first predetermined number of consecutive images fails to meet the first motion criterion, trim from the first plurality of images: (i) the first predetermined number of consecutive images, and (ii) images from the pre-capture image sequence captured prior to the first predetermined number of consecutive images.

20. The system of claim 17, wherein the second subset of images from among the post-capture image sequence are identified based on a determination of whether the motion information of each of at least a second predetermined number of consecutive images of the post-capture image sequence fails to meet the second motion criterion.

* * * * *